United States Patent
Satoyama et al.

(10) Patent No.: US 10,740,250 B2
(45) Date of Patent: Aug. 11, 2020

(54) STORAGE APPARATUS

(71) Applicant: Hitachi, Ltd., Tokyo (JP)

(72) Inventors: Ai Satoyama, Tokyo (JP); Tomohiro Kawaguchi, Tokyo (JP); Nobumitsu Takaoka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 89 days.

(21) Appl. No.: 16/076,726

(22) PCT Filed: Jul. 19, 2016

(86) PCT No.: PCT/JP2016/071166
§ 371 (c)(1),
(2) Date: Aug. 9, 2018

(87) PCT Pub. No.: WO2018/016003
PCT Pub. Date: Jan. 25, 2018

(65) Prior Publication Data
US 2019/0050345 A1  Feb. 14, 2019

(51) Int. Cl.
| | |
|---|---|
| *G06F 3/06* | (2006.01) |
| *G06F 12/109* | (2016.01) |
| *G06F 12/00* | (2006.01) |
| *G06F 12/02* | (2006.01) |

(Continued)

(52) U.S. Cl.
CPC .............. *G06F 12/109* (2013.01); *G06F 3/06* (2013.01); *G06F 3/08* (2013.01); *G06F 11/1004* (2013.01); *G06F 11/1076* (2013.01); *G06F 12/00* (2013.01); *G06F 12/02* (2013.01); *G06F 12/0253* (2013.01); *G06F 2212/1044* (2013.01); *G06F 2212/7201* (2013.01); *G06F 2212/7205* (2013.01)

(58) Field of Classification Search
CPC .............. G06F 12/1036; G06F 12/109; G06F 2212/651
See application file for complete search history.

(56) References Cited

U.S. PATENT DOCUMENTS

| | | |
|---|---|---|
| 8,527,544 B1 | 9/2013 | Colgrove et al. |
| 2010/0023721 A1* | 1/2010 | Ito ....................... G06F 12/0246 711/166 |
| 2010/0082900 A1* | 4/2010 | Murayama ............ G06F 3/0608 711/114 |

FOREIGN PATENT DOCUMENTS

| | | |
|---|---|---|
| JP | 2010-026933 A | 2/2010 |
| JP | 2010-086424 A | 4/2010 |

OTHER PUBLICATIONS

International Search Report of PCT/JP2016/071166 dated Sep. 13, 2016.

* cited by examiner

*Primary Examiner* — Edward J Dudek, Jr.
(74) *Attorney, Agent, or Firm* — Mattingly & Malur, PC

(57) ABSTRACT

A storage device allocates an address area of an address space to the first virtual address space in accordance with writing onto a first virtual address space. A controller manages an address area in the first virtual address space, in which address area a mapping to the real address space has been removed, as a usage prohibition area. When a use state of the first virtual address space reaches a predetermined criterion, the controller or the storage device adds new continuous address areas to the first virtual address space to expand the first virtual address space. The storage device allocates an area, in which a mapping to the first virtual address space has been removed, to the first virtual address space expanded.

13 Claims, 25 Drawing Sheets

(51) Int. Cl.
*G06F 3/08* (2006.01)
*G06F 11/10* (2006.01)

FIG.8

CACHE MAPPING INFORMATION  2100

| CACHE ADDRESS SPACE | | LS CACHE ADDRESS SPACE | |
|---|---|---|---|
| PAGE NUMBER | BLOCK NUMBER | PAGE NUMBER | BLOCK NUMBER |
| 1 | 1 | 1 | 1 |
| 1 | 2 | 1 | 3 |
| 1 | 3 | 1 | 4 |
| ... | | | |
| 1 | 100 | 2 | 2 |
| ... | | | |
| 2 | 1 | | |
| ... | | | |

2101   2102   2103   2104 f → (row 1)
s → (row "2 | 1")

FIG.9

MAPPING INFORMATION BETWEEN CACHE AND POOL  2200

| PAGE NUMBER IN LS CACHE ADDRESS SPACE | POINTER TO PAGE IN POOL |
|---|---|
| PAGE NUMBER IN LS CACHE ADDRESS SPACE | POINTER TO PAGE IN POOL |
| ... | ... |

| DATA NODE |
|---|
| A |
| C |
| E |

| DATA NODE |
|---|
| B |
| D |
| F |

| PARITY NODE |
|---|
| A(XOR)B |
| C(XOR)D |
| E(XOR)F |

FIG.20B

| DATA NODE |
|---|
| A→0 |
| C |
| E |

| DATA NODE |
|---|
| B |
| D |
| F |

| PARITY NODE |
|---|
| A(XOR)B |
| C(XOR)D |
| E(XOR)F |

FIG.20C

| DATA NODE |
|---|
| 0 |
| C |
| E |

| DATA NODE |
|---|
| B |
| D |
| F |

| PARITY NODE |
|---|
| A(XOR)B→(A(XOR)B)(XOR)A=B |
| C(XOR)D |
| E(XOR)F |

STORAGE APPARATUS

TECHNICAL FIELD

The present invention relates to a storage apparatus.

BACKGROUND ART

An all flash array (AFA) is often used as a primary storage in these days, and the I/O performance thereof has been increasingly regarded as important. Since the flash memory is expensive, most of the AFAs have a compression/duplication elimination function that suppresses the usage amount of the flash memory.

In the flash memory, when writing data onto a storage area in the volume, in which storage area data written in previous time (called old data) has been stored, the data is not overwritten onto the same storage area, but is added to a new area. Generally, the area storing the old data is not the free area, and is called garbage. The garbage is the unusable and invalid area into which data cannot be written. If the garbage increases, it is the same as wasting the storage area. Accordingly, the storage apparatus performs garbage collection (hereinafter, GC) to ensure a free area when a predetermined amount of the garbage is accumulated. The GC makes the garbage into a reusable area.

The GC is disclosed, for example, in Patent Document 1. The GC copies only valid data in the storage area having accumulated garbage into a new other storage area, and then erases all data in the storage area having the accumulated garbage.

PRIOR ART DOCUMENT

Patent Document

Patent Document 1: U.S. Pat. No. 8,527,544

SUMMARY OF THE INVENTION

Problem to be Solved by the Invention

When the storage controller performs GC, the storage controller moves data via a cache area. The storage controller generates, for example, blank page (a storage area having a regulated size) by the GC. The storage controller reads from a flash device to the cache only valid data in a page, and copies it onto an area allocated to a new page in the cache. The storage controller then erases all data in the cache and in the copy source page of the flash device.

Copying data for such GC described above involves a heavy load, which causes the performance of the entire storage apparatus to be lowered. Accordingly, it is desired in the storage apparatus to reduce the load with the GC to improve the I/O performance.

Means for Solving the Problem

An exemplary storage apparatus according to the present invention includes a storage device and a controller. A plurality of hierarchical address spaces mapped between a virtual volume and a storage medium are defined. The plurality of hierarchical address spaces include a real address space that is an address space of the storage medium of the storage device and that is managed by the storage device, a first virtual address space that is an address space of the storage device and that can be recognized by the controller, and a second virtual address space provided between the first virtual address space and the virtual volume. The controller allocates an address area of the second virtual address space to the virtual volume in accordance with writing onto the virtual volume. The controller allocates a different address area of the second virtual address space for overwriting onto a same address of the virtual volume. The storage device allocates an address area of the address to the first virtual address space in accordance with writing onto the first virtual address space. The controller manages an address area in the first virtual address space, in which address area a mapping to the real address space has been removed, as a usage prohibition area. When a use state of the first virtual address space reaches a predetermined criterion, the controller or the storage device adds new continuous address areas to the first virtual address space to expand the first virtual address space. The controller expands the second virtual address space in accordance with the expansion of the first virtual address space. The storage device allocates an area, in which a mapping to the first virtual address space has been removed, to the first virtual address space expanded.

Effect of the Invention

According to one aspect of the present invention, I/O performance in the storage apparatus can be improved.

BRIEF DESCRIPTION OF THE DRAWINGS

FIG. 8 depicts a format example of a mapping table between a cache address space and an LS cache address space.

FIG. 9 depicts a format example of mapping information between the cache and a pool.

FIG. 20A depicts an example of changing data, in a flash package, executed by an expansion UNMAP command and parity write command.

FIG. 20B depicts an example of changing data, in a flash package, executed by an expansion UNMAP command and parity write command.

FIG. 20C depicts an example of changing data, in a flash package, executed by an expansion UNMAP command and parity write command.

MODE FOR CARRYING OUT THE INVENTION

Figure 1:
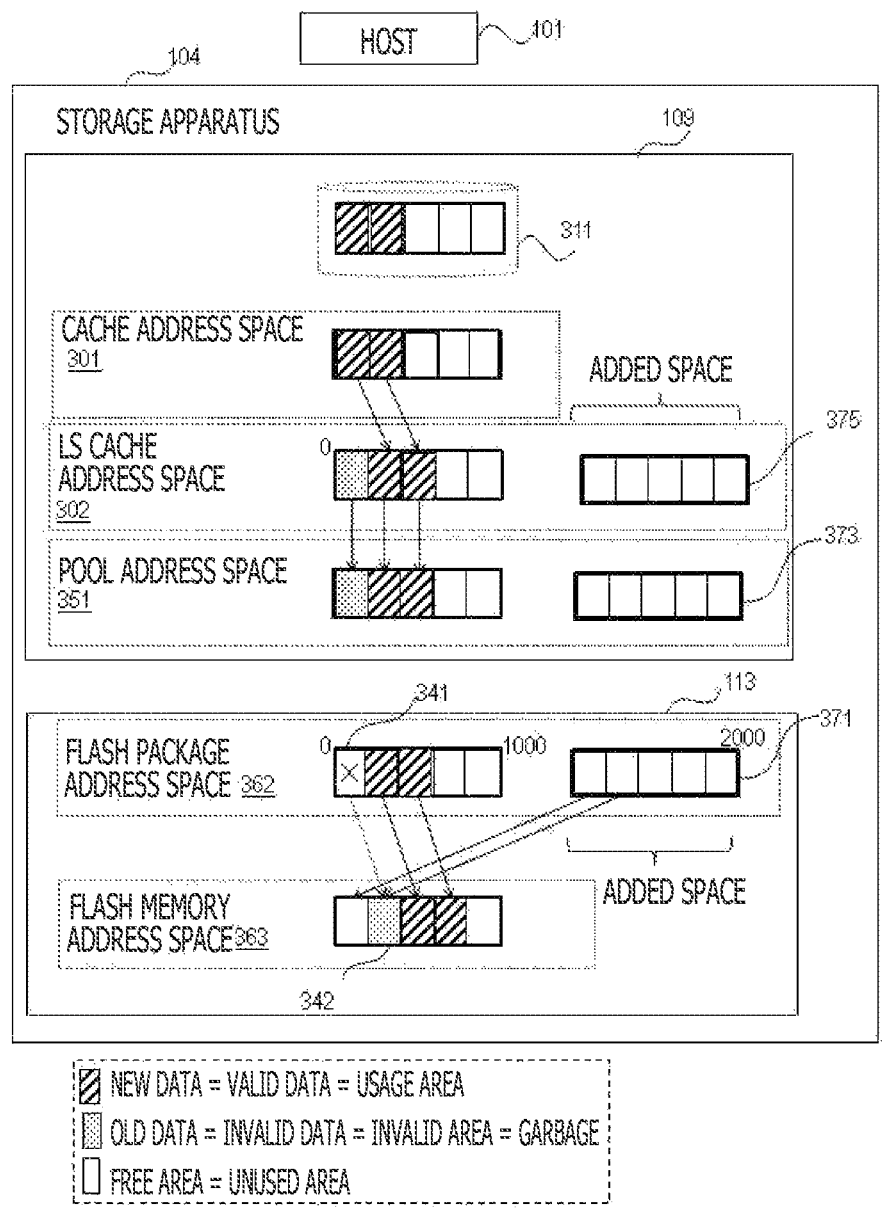
FIG. 1 depicts a scheme of an embodiment.

An embodiment is hereinafter described with referring to the drawings. The embodiment is just an example that embodies the invention, and the technical range of the invention is not limited thereto. Note that, in the drawings, the same structure has the same reference numeral.

In addition, the following description describes some pieces of information in the present invention with using an expression "table." However, the information is not necessarily expressed by data structure of the table, and may be expressed by data structure of "list," "database (DB)," "cue," or the like. Thus, "table," "list," "DB," and "cue" can be called just as "information" to indicate that the information is not dependent on the data structure.

Each piece of information can be described with expressions "identifying information," "identifier," "designation," "name," and "ID," which are exchangeable with each other. Read/write processing may be described as read-out/write-in processing or update processing, or otherwise, may described collectively as access-requiring/access-processing.

(1) Overview

The present embodiment discloses a technology, in the storage apparatus that adds data to the storage device, to reduce a processing load for creating continuous free areas of a desired size in an address space to which the storage controller refers. In a virtual address space mapped to a real address space of the storage device, the storage controller removes a mapping of an area which has been mapped to the real address space, and further, changes the area to an unused area. The storage controller adds new address area to the virtual address space to expand the virtual address space.

The virtual address space is an address space having a larger capacity than that of the real address space (real address area) which is actually mapped (allocated). As for the free area in the virtual address space, the area in the real address space is not mapped. The free area in the real address space is mapped to the free area in the virtual address space at the timing when data is stored in the free area of the virtual address space. The area in the real address space may be mapped to the free area in the expanded virtual address space.

The storage controller can secure desired continuous free areas in the virtual address space without data movement for conventional garbage collection. Overhead occurred by the garbage collection is suppressed, and thus the I/O performance can be prevented from being degraded. The storage controller can ensure large, continuous free areas by adding a new address area to the end of virtual address space.

FIG. 1 depicts the outline of the embodiment. The storage apparatus 104 provides the virtual volume 311 to the host 101. The capacity of the virtual volume 311 is virtualized. In accordance with the writing into the virtual volume 311, an address area (page) of a predetermined size from a pool configured by a plurality of pool volumes is allocated to a target address area (page) of the virtual volume 311.

In the storage apparatus 104, a plurality of hierarchical address spaces are defined. There are a flash memory address space 363, a flash package address space 362, a pool address space 351, a log structured (LS) cache address space 302, and a cache address space 301.

The flash memory address space 363 is an address space of the flash memory, which is a storage place into which the user data is finally stored, and is a real (physical) address space. The capacity of the real address space is equal to a capacity into which data can be actually stored. Addresses in the flash memory address space 363 are allocated uniquely to the physical storage area of the flash memory that is a physical memory media.

The flash package address space 362 is an address space of the flash package 113, which is a storage device including the above flash memory. The flash package 113 dynamically allocates the area of the flash memory address space 363 to the area of the flash package address space 362. Specifically, on receiving the write request, the flash package 113 allocates the addresses of the flash memory address space 363 to the addresses of the flash package address space 362 at the timing when the data is actually stored into the flash memory.

A plurality of the flash packages can constitute a redundant array of inexpensive disks (RAID) group. The pool address space 351 is an address space of the thin provisioning pool. The pool address space 351 dynamically allocates (the address area) to the virtual volume.

The flash package address space 362 and the pool address space 351 are virtual address spaces. The addresses in the virtual address space are not necessarily be allocated to the physical (real) storage area, and the capacity of the virtual address space can be virtually expanded. In other words, the capacity of the virtual address space can become larger than the capacity of the actually allocated physical storage area (mapped real address area).

An LS cache address space 302 is an address space of an LS cache that is the cache of post script type. When the same address in the virtual volume 311 is overwritten, the different area (slot) in the LS cache is allocated therefor. The cache address space 301 is an address space of a normal cache. When the area of the cache address space 301 is already allocated to the address of the virtual volume 311, the overwritten data is stored in the allocated area.

The storage apparatus 104 collects garbage formed in the flash memory, and then provide the collected garbage to the host 101. The garbage is an area in which the old data has been stored, and is the unusable and invalid area into which data cannot be written. The garbage is separated from the flash package address space 362 (virtual address space) before being reallocated, and the data within the garbage is deleted either physically or logically. In the following description, the area from which the data has been deleted and which is not reallocated yet may be called the garbage.

The use of the address area of the flash package address space 362 whose mapping to the garbage has been removed is prohibited. As a result, the use of the address area of the pool address space 351 mapped to that address area is also prohibited. When the address area whose mapping is to be removed has a size smaller than the size needed for allocating the page to the virtual volume, for example, it is impossible to allocate solely the address area to the virtual volume. The required size of the flash package 113 in order to allocate one page to the virtual volume depends on the page size and the RAID configuration. In the example in FIG. 1, one page is stored in one flash package 113.

The storage apparatus 104 adds continuous address areas to the flash package address space 362. The flash package 113 expands the flash package address space 362, which causes the flash package to appear to be enlarged in capacity. In accordance with the expansion of the flash package address space 362, the storage apparatus 104 also expands the pool address space 351. The garbage is changed into the free area, and then reallocated to the free area of the expanded flash package address space 362. As described above, the area in the flash memory address space 363 is allocated at the time of data writing.

The address areas prohibited from using in the flash package address space 362 and the pool address space 351 are discrete. The discrete address areas are replaced as the continuous address areas by adding new continuous address areas thereto. By this method, the continuous free areas can be effectively provided to the host without data movement through LS cache for the garbage collection.

For example, the garbage block (free block) 342 in the flash memory address space 363 is allocated to the block in the added space 371 in the flash package address space 362. Note that the garbage block (free block) 342 can also be allocated to the free block in the existing space.

The storage controller 109 adds a new address area 373 to the flash side pool address space 352 in accordance with the expansion of the flash package address space 362 to thereby expands the flash side pool address space 352.

The storage controller 109 adds the address area 375 to the pool address space 351 in accordance with the expansion of the flash side pool address space 352 to thereby expands the pool address space 351. The storage controller 109 creates a new pool volume based on the increased capacity of the flash side pool address space 352, and then adds the new pool volume to the pool. In this way, the continuous free areas 375 can be provided to the host 101.

The storage controller 109 expands the LS cache address space 302. The storage controller 109 adds a physical storage area to the LS cache area. Data is added in the LS cache area. This causes the generation of the unusable garbage in the cache memory.

By adding the physical storage area of the LS cache, the LS cache area (free area) which is usable in accordance with the expansion of the pool address space 351 can be increased preferably. Addition of the storage area to the LS cache area increases the continuous storage areas.

As described above, the collected free areas obtained through the expansion of the flash package address space are provided to the host 101. Thus, the load in the data movement involved with the garbage collection processing for ensuring the free capacity is reduced. Note that the storage controller 109 may not expand the LS cache address space 302, or may omit the LS cache. The storage apparatus may use another storage medium having a different type from the flash memory.

(2) System Configuration
(a) System Hardware Configuration

Figure 2:
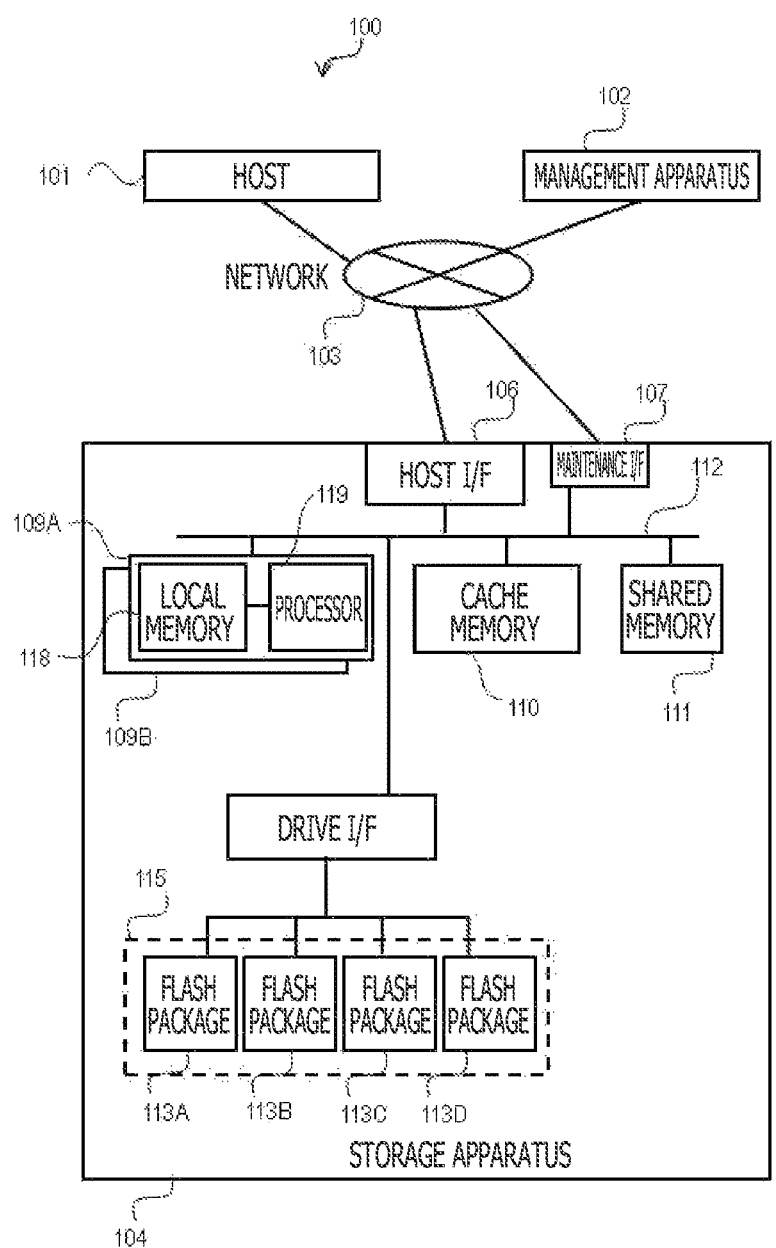
FIG. 2 depicts a configuration example of a computer system.

FIG. 2 depicts a configuration example of the computer system 100. The computer system 100 includes a host computer (host) 101, a management apparatus 102, and a storage apparatus 104. The host 101, the management apparatus 102, and the storage apparatus 104 are connected with each other via a network 103.

The network 103 is, for example, a storage area network (SAN) formed by using a fiber channel. The network 103 can use an I/O protocol of the mainframe as well as the protocol by which an SCSI command can be send. The management apparatus 102 can be connected therewith through another management network different from the network 103. The management apparatus 102 may be omitted.

As depicted in FIG. 1, the host 101 is a computer that executes an application program and that accesses a logical storage area of the storage apparatus 104 via the network 103. The storage apparatus 104 stores a data into the storage area of the flash package 113. There may be provided a plurality of hosts 101. Note that the storage apparatus 104 may be called a storage system or a storage sub system.

The host 101 includes, for example, an input device, an output device, a central processing unit (CPU), a memory, a disk adapter, a network adapter, and a storage device. Note that the CPU in each host 101 executes an application program used by a user and executes a storage apparatus control program for performing interface control for the storage apparatus 104.

The host 101 is a computer that uses a virtual volume provided by the storage apparatus 104. The host 101 issues a read command, a write command, and the like to the virtual volume, thereby to access the data stored in the virtual volume.

The management apparatus 102 is a computer that manages the storage apparatus 104 (for example, configures the storage area of the storage apparatus 104), and has a processor and a memory similar to the general computer. The management apparatus 102 executes a management program for managing the storage apparatus 104. The management apparatus 102 includes input/output devices such as a keyboard and a display, a CPU, a memory, a network adaptor, and storage device, and outputs (displays), for example, the information on the condition of the storage apparatus 104.

The storage apparatus 104 provides one or more volumes (a virtual volume or a logical volume) to the host 101. The storage apparatus 104 includes a host interface 106, a maintenance interface (I/F) 107, storage controllers 109 (109A and 109B), at least one cache memory 110, at least one shared memory 111, and flash packages 113 (113A to 113D).

These hardware configuration are made redundant. In addition, these elements are connected with each other via a bus 112. Among these configuration elements, the host I/F 106, the maintenance I/F 107, the storage controller 109, the cache memory 110, the shared memory 111, and the bus 112 may collectively be called the storage controller.

The host I/F 106 is an interface device used for the storage apparatus 104 to communicate with an initiator such as the host 101. The command (read command, write command, or the like) issued by the host 101 in order to access the volume (the virtual volume in the following example) arrives at the host I/F 106. The storage apparatus 104 returns the information (for example, a read data or a write response) from the host I/F 106 to the host 101.

The maintenance I/F 107 is an interface device for the storage apparatus 104 to communicate with the management apparatus 102. The command from the management apparatus 102 arrives at the maintenance I/F 107. The storage apparatus 104 returns the information from the maintenance I/F 107 to the management apparatus 102.

In FIG. 2, both the host I/F 106 and the maintenance I/F 107 are connected to the network 103 in FIG. 2, however, they may be configured in other ways. The network to which the host I/F 106 is connected and the network to which the maintenance I/F 107 is connected may be different ones.

The cache memory 110 is configured by a random access memory (RAM) or the like, and temporarily stores therein the data written and read by the flash package 113. The shared memory 111 is configured by a hard disk, a flash memory, RAM, or the like, and stores therein a program executed in the storage controller 109, the configuration information, and the like.

The storage controller 109 is a package board that includes a processor 119 and a local memory 118. The processor 119 is a device that executes programs for performing various control of the storage apparatus 104. The local memory 118 is used for temporarily saving a program executed by the processor 119 and the information used by the processor 119.

FIG. 2 depicts a configuration in which the storage apparatus 104 includes two storage controllers 109 (109A and 109B), however, the number of the controllers 109 may be other than two. The configuration may be such that the storage apparatus 104 mounts thereon only one storage controller 109, or mounts thereon three or more controller 109.

The cache memory 110 is used for temporarily storing the write data to the virtual volume (flash package 113), or the data (read data) read out from the virtual volume (flash package 113). For the cache memory 110, a volatile memory such as DRAM or SRAM is used. As another embodiment, a non-volatile memory may be used for the cache memory 110.

In the case where the volatile memory is used for the cache memory 110, the storage apparatus 104 may be configured to mounts thereon an auxiliary power source such as a battery so as to retain the stored contents of the cache memory 110 with using the auxiliary power source when a power failure occurs.

The shared memory 111 is a storage area for storing therein the management information used by (the processor 119 of) the storage controller 109. For the shared memory 111, similarly to the cache memory 110, a volatile memory such as DRAM or SRAM is used, however, a non-volatile memory may be used. The cache memory 110 and the shared memory 111 are storage areas different from the local memory 118 in that they cannot be accessed from the processor 119 of any storage controller 109.

The flash package 113 is a storage device that includes a non-volatile memory media for storing at last the write data from the host 101. The storage controller 109 has the RAID function which can retrieve the data in one flash package 113 for high reliability even when the flash package 113 fails.

In the case where the storage controller 109 has the RAID function, a plurality of the flash packages 113 constitutes one RAID group. This is called flash package group 115. The storage controller 109 may not have the RAID function. The flash package 113 can use, for example, a non-volatile semiconductor such as a magnetic disk and a flash memory as a storage medium. One example for the flash package is a solid state drive (SSD).

The flash package 113 may have a function (compression function) of compressing the write data and store the result in own storage medium. The flash package 113 may not have the compression function. The flash package 113 provides one or more logical storage areas (logical volume) on the basis of the RAID group. The logical volume is associated with a physical storage area in the flash package 113 of the RAID group.

(b) Flash Package

Figure 3:
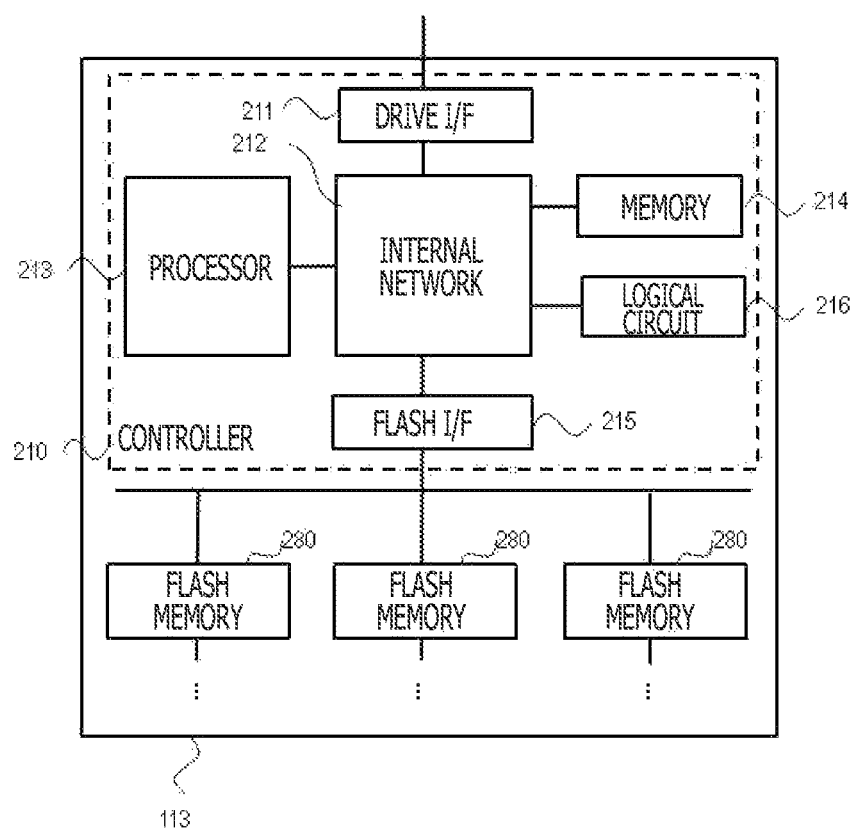
FIG. 3 depicts a configuration example of a flash package.

FIG. 3 depicts a configuration example of the flash package 113. The flash package 113 includes a controller 210 and a flash memory 280 which is a storage medium for storing therein a write data from the host 101. The controller 210 includes a drive I/F 211, a processor 213, a memory 214, a flash I/F 215, and a logical circuit 216 having the compression function, which are connected with each other via the internal network 212. The compression function may not be provided.

The drive I/F 211 is an interface device for communicating with the storage apparatus 104. The flash I/F 215 is an interface device for the controller 210 to communicate with the flash memory 280.

The processor 213 executes a program for controlling the flash package 113. The memory 214 stores therein the program executed by the processor 213, the control information used by the processor 213, and the like. The processing (management of a storage area, processing of access request from the storage apparatus 104, and the like) executed by the flash package 113 described below is effected by the processor 213 executing the program. The processor 213 receives a read request or a write request from the storage controller 109, and executes processing following the received request.

The processor 213 receives a write request from the storage controller 109, and writes the data following the write request onto the flash memory 280. At this stage, the write request is completed (the completion of the write request is reported to the storage controller 109). Alternatively, the data read or written between the storage controller 109 and the flash memory 280 may be temporarily stored in a buffer (not depicted). The processor 213 may write the data following the write request from the storage controller 109 into the buffer, and at this stage, the completion report of the write request may be send to the storage controller 109.

(3) The Relation Between the Page and the Block

In the present embodiment, the storage apparatus 104 has a function of capacity virtualization. A control unit in the capacity virtualization is called a page. In this embodiment, the size of the page is larger than that of the block which is an erasure unit for the flash memory. The size of the page is, for example, X times as large as the size of the block (X is an integer of two or more).

In the flash memory, the unit in reading and writing is generally called the page. However, in the present embodiment, the page means, as already described, the control unit in the capacity virtualization (a storage area unit allocated to the virtual volume in accordance with the thin provisioning), and the size of the page is larger than that of the block. In addition, in the present embodiment, the reading and writing units in the flash memory are called "segments" so as to distinguish it from the page which is a control unit in the capacity virtualization.

Figure 4:
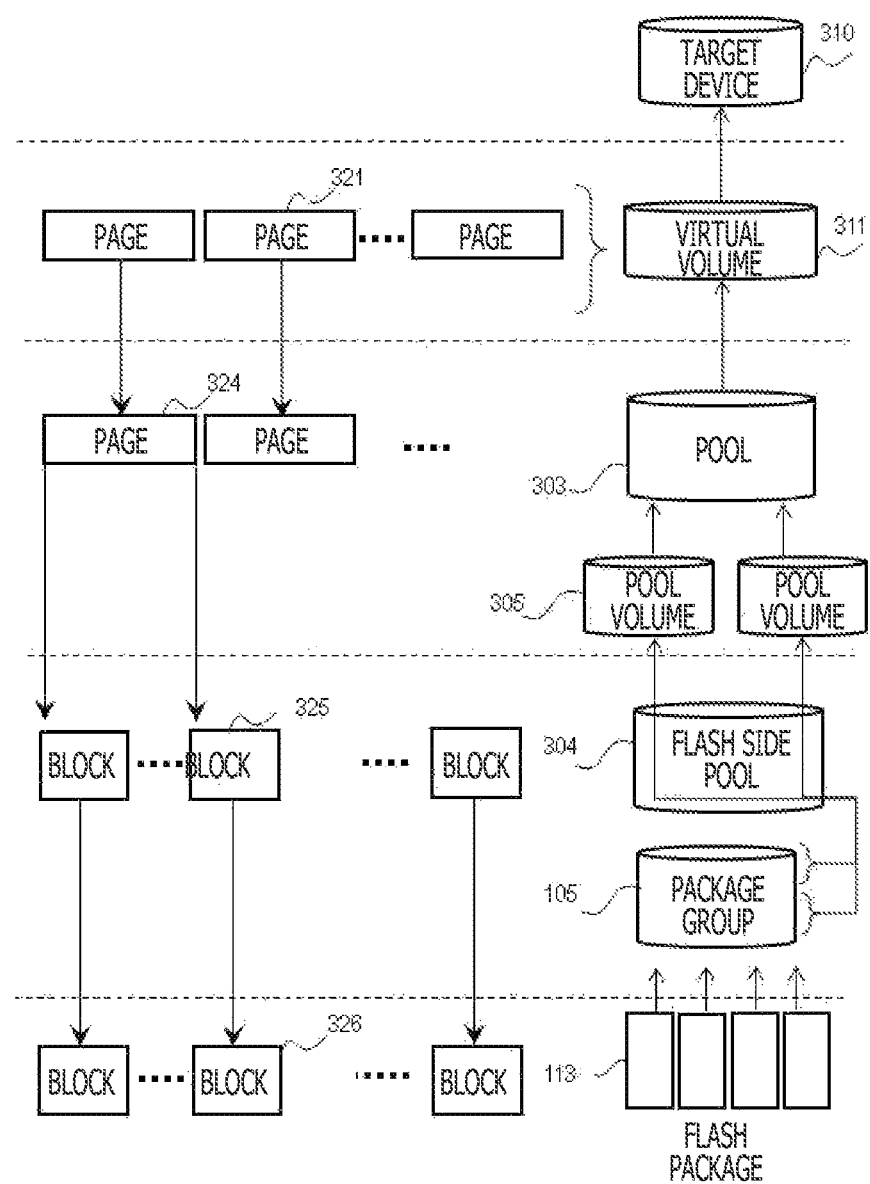
FIG. 4 depicts relations between virtual pages, pages, virtual blocks, and real blocks.

FIG. 4 depicts relation between the pages 321 of the virtual volume 311, the pages 324 of the pool, the blocks 325 of the flash side pool 303, and the blocks 326 of the flash package. The pages 324 of the pool 303 may store therein redundant data which is not included in the pages 321 of the virtual volume 311.

The target device 310 is a storage area in the virtual volume or the logical volume, and the target device 310 permits an access from the host 101. The pages 321 constitute the virtual volume 311. The virtual volume 311 is a virtual storage area to which the thin provisioning and/or the tearing defined with using the pool 303 have been applied. The pool 303 is a collection of the pool volumes 305 used for the thin provisioning or the tearing.

The pool volume 305 belongs to one pool 303. Each of the pages 324 is cut out from the pool volume 305 (pool 303). The page 324 is allocated to the page 321 in the virtual volume. To the page 324, the real storage area of the flash package group (RAID group) 115 is allocated via the flash side pool 304. The RAID group is defined with using a plurality of flash packages (storage devices) 113. Thus, the high reliability, the high speed, and the great capacity are attained with the RAID.

In the present embodiment, the unit of the capacity of the flash package 113 is a block which is the erasure unit for the flash memory. The storage controller 109 accesses the flash package 113 by the block unit. The block 325 of the flash side pool 304 is recognized as the virtual block by the storage controller 109. The block 326 is a real block that actually stores data therein.

The flash side pool 304 is constituted from the virtual blocks 325. The page 324 in the pool 303 is associated with one or more virtual blocks 325. The data stored in the virtual block 325 is stored in the real block 326 in the flash package 113. When the flash package 113 uses the compression function, the compressed data is stored in the real block 326.

In the present embodiment, data in m (m is an integer equal to or more than one) virtual blocks 325 is stored in n (one to m according to the compression rate if using the compression function) real blocks 326. The above storing method is just an example.

The virtual block 325 in the flash side pool 304 is mapped to the real block 326 via a block in the flash package address space 362. The flash package address space 362 is recognized as the address space of the flash package by the storage controller 109.

In one flash package 113, the capacity of the flash package address space 362 configured by the virtual blocks may be larger than the capacity configured by the real blocks 326. The real blocks 326 are blocks in the flash memory address space 363. The flash package 113 allows the storage controller 109 to recognize that the number of the virtual blocks provided in the flash package 113 is larger than that of the real blocks. The capacity constituted by the virtual blocks is larger than the capacity constituted by the real blocks.

The flash package 113 is configured such that upon receiving from the storage controller 109 a write request designating an address belonging to a virtual block 325 to which any real block 326 is not allocated yet, the flash package 113 allocates a real block 326 to the virtual block 325.

(4) The Layer Structure of the Storage Areas

Figure 5:
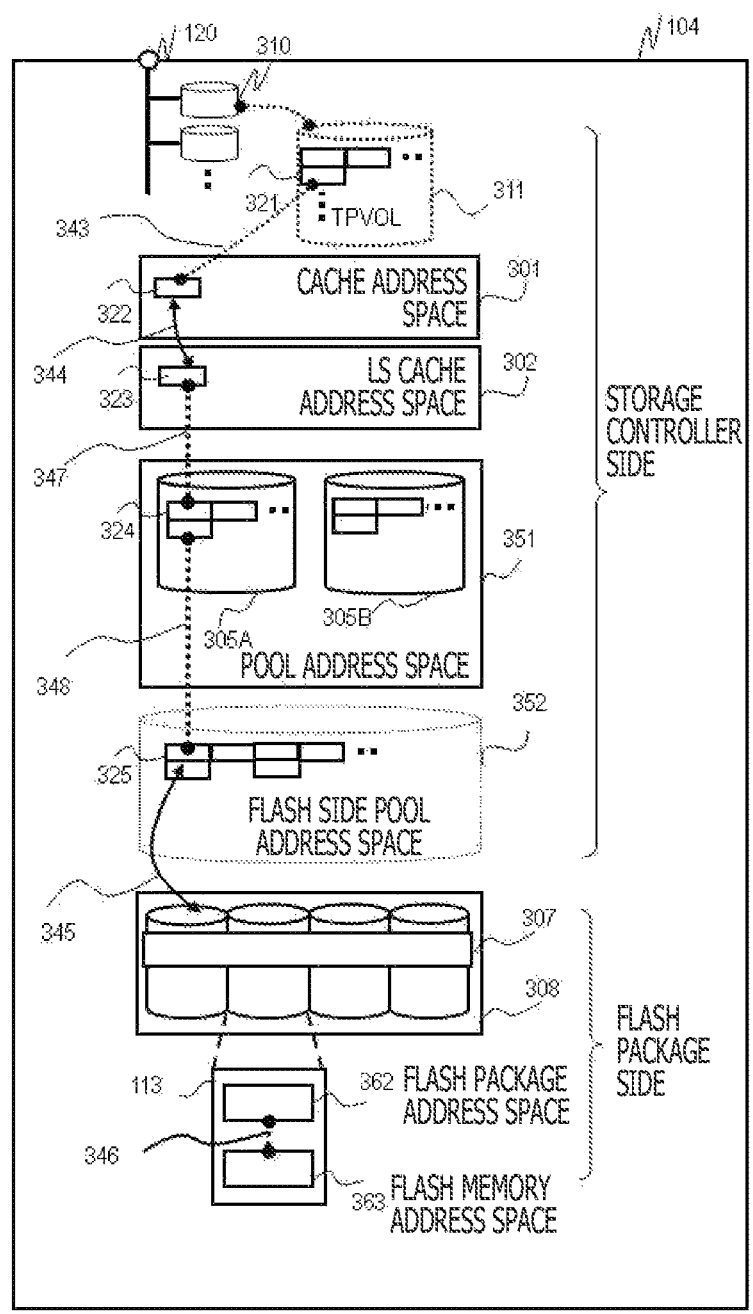
FIG. 5 depicts an example of a layer configuration of a storage area according to the embodiment.

FIG. 5 depicts an example of the layer structure of the storage areas according to the embodiment. Hereinafter, the descriptions of the storage areas are sequentially made from the lower layer. The RAID group 308 is configured, as described above, by the plurality of flash packages 113 which are of the same kind and have the same communication interface. There is defined a stripe array (storage area) 307 that strides the plurality of flash packages 113. A flash memory address space 363 is defined for the flash memory 280 in the flash package 113.

Further, there is defined a flash package address space 362 that is used for mapping the flash memory address space 363 and the flash side pool address space 352. The flash memory address space 363 and the flash package address space 362 are defined for each of the flash packages 113.

The flash side pool 304 is provided above the RAID group 308. The flash side pool 304 is virtual memory resource based on the RAID group 308. The flash side pool address space 352 is defined for the flash side pool 304. This address space 352 is an address space for mapping the address space managing the memory capacity in the storage controller 109 side with the address space managing the memory capacity in the flash package.

The mapping between the flash package address space 362 and the flash side pool address space 352 is maintained (static) if once determined. Also the mapping between the flash side pool address space 352 and the pool address space 351 is static.

The pool 303 in the storage controller 109 side is formed by a plurality of pool volumes 305. The pool volume 305 is an offline volume, and is not associated with the target device designated by the host 101. The pool volume 305 is configured by a plurality of pages 324.

The blocks configuring the page 324 are each mapped to each of the blocks 325 in the flash side pool 304 (space 353) in one-to-one relationship. The block 325 is associated with the storage area of the stripe array 307. The data to be stored in the block of the page 324 is stored in the stripe array 307 associated with that block. A plurality of stripe arrays 307 may be associated with one page 324.

To the virtual page 321 of the virtual volume (thin provisioning volume (TPVOL)) 311, whose capacity has been virtualized, a blank page in the pool 303 mapped and associated with that TPVOL 311 is mapped. The storage controller 109 maps the blank page in the allocated pool 303 to the block in the flash side pool address space 352 by the block unit, and manages the mapping. In other words, the block is an unit for I/O with the storage controller 109.

The storage controller 109 searches blocks in the flash package address space 362 to which the blocks in the flash side pool address space 352 are mapped, and thus issues a read/write request to the flash package side. The mapping may be conducted by a segment unit.

To the TPVOL 311, the cache address space 301 is allocated. The virtual page of the TPVOL 311 is a unit of the virtual memory capacity that does not have a real storage area. When there is a read/write request from the host 101 to the TPVOL 311, the page of the pool volume 305 is allocated to the virtual page of the TPVOL 311.

In the embodiment, when the storage apparatus 104 receives a write request from the host 101 for the virtual page of the TPVOL 311 to which a page is not allocated, the storage apparatus 104 allocates a page from the pool to that virtual page. Upon receiving the write request onto that virtual page, the storage apparatus 104 adds data to a free space of the allocated page. When all of the free space of the allocated page is used, the storage apparatus 104 allocates a new page to that virtual page.

The cache address space 301 represents an address space of the cache area in accordance with the capacity of the TPVOL 301, and their capacities correspond to each other. In the case of write request, the area on the cache address space 301 is allocated to the virtual page of the TPVOL 301 by the capacity corresponding to that of the page. The virtual page of the TPVOL 301, the allocated area (capacity of which is corresponding to the page) on the cache address space 301, and the page on the pool address space 351 (pool volume 305) are mapped and associated.

Two areas are allocated to the virtual volume executing compression and/or duplication elimination. The address space of the first cache area is the cache address space 301, and the address of the second cache area is the cache address space 302. By executing the compression and/or duplication elimination, the size of the data changes. Thus, when overwriting onto the same address of the TPVOL 301 is performed, the real storage area is not always the same as that in the previous writing. Due to this, the real storage area in which data is stored may become larger than the data, and the efficiency in the capacity may be worse.

The storage apparatus 104 uses the address space (second cache address space) 302 of the second cache area separately from the first cache address space 301. The second cache area and the address space thereof are correspondence with each other in the capacity. The storage apparatus 104 stores data in the cache address space 301 (cache area), and then performs compression/duplication elimination processing. After that, the storage apparatus 104 stores the data in the second cache address space 302 (second cache area).

When storing data in the second cache address space 302, the storage apparatus 104 does not overwrites, but adds, the data. The data of correspondence and address mapping between the first cache address space 301 and the second cache address space 302 are managed in the address mapping table.

The page of the pool volume 305 is allocated to the first cache address space 302. The second cache address space 302 is called LS cache address space. The first cache address space 301 may be omitted. The first cache and the LS cache are, for example, physically defined in the storage area in one cache memory 110, and logically defined in two address spaces.

The target device 310 is defined above the TPVOL 311. One or more target devices 310 are associated with the communication port 120 of FC IF, and the TPVOL 311 is associated with the target device 310.

The host 101 sends to the storage apparatus 104 an I/O request (write request or read request) designating the target device 310. As described above, the TPVOL 311 is associated with the target device 310. Upon receiving a write command designating the target device 310 associated with the TPVOL 311, the storage apparatus 104 selects a blank page 324 from the pool 303 and allocate the selected page to the virtual page 321 to which writing is performed.

The storage apparatus 104 writes the write data into the page 324 to which writing is performed. When writing data into the into the page 324, the data is written into the stripe array 307 associated with the block 325 of the flash side pool address space 352 mapped to the page 324. It means that the data is written into the flash memory 280 associated with the stripe array 307.

In the above description, if the unit of the managing data is standardized, the pool 303 and the flash side pool 304 can be managed by setting one pool.

(5) Management Information

Figure 6:
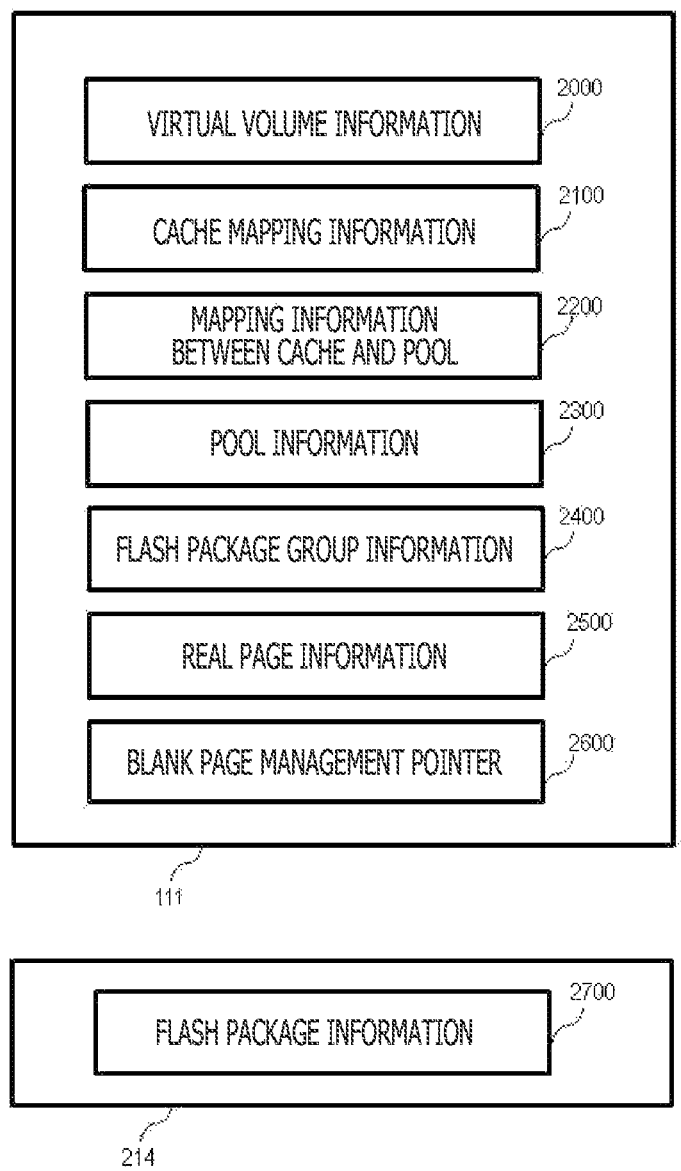
FIG. 6 depicts management information stored in a shared memory of a storage apparatus.

FIG. 6 depicts management information stored in the shared memory 111 of the storage apparatus 104. Stored in the shared memory 111 are virtual volume information 2000, cache mapping information 2100, mapping information 2200 between the cache and the pool, pool information 2300, flash package group information 2400, page information 2500 of the page, and a blank page management pointer 2600.

The blank page management pointer (information) 2600 manages blank pages for every flash package group 115. The flash package information 2700 is stored in the memory 214 of the flash package 113. In the present embodiment, the storage controller 109 has a capacity virtualization function. However, the storage controller 109 may not have the capacity virtualization function.

Figure 7:
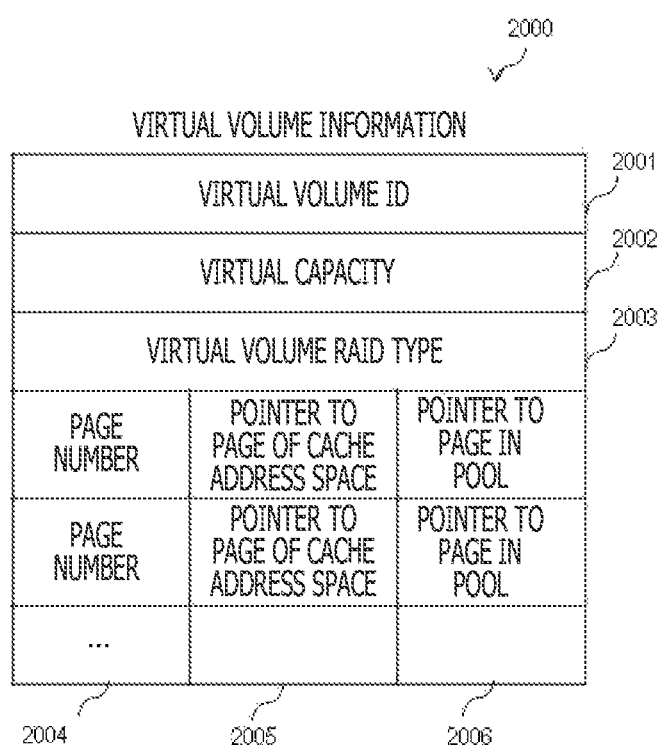
FIG. 7 depicts a format example of information on one virtual volume (TPVOL) indicated by virtual volume information.

FIG. 7 depicts a format example of information on one virtual volume (TPVOL) indicated by the virtual volume information 2000. The virtual volume information 2000 retains information on a plurality of virtual volumes in the device. The virtual volumes are virtual storage device which store therein data read or written by the host 101. The host 101 designates the ID of the virtual volume, the address in the virtual volume, and the length of the target data to issue a read request and a write request.

The virtual volume information 2000 indicates the virtual volume ID 2001, a virtual capacity 2002, a virtual volume RAID type 2003, a virtual volume page number 2004, pointer 2005 to pages in the cache address space, and a pointer 2006 to pages in the pool.

The virtual volume ID 2001 indicates the corresponding virtual volume ID. The virtual capacity 2002 indicates a capacity of the virtual volume recognized by the host 101. The virtual volume RAID type 2003 indicates the RAID type (for example, RAID 0, RAID 1, and the like) of the virtual volume. In the case where redundant data is stored into one flash package 113 among N flash packages 113 as in the case of RAID 5, the concrete value of N is designated.

The virtual volume page number 2004 indicates the page number of the virtual volume. The page number value of the page number 2004 of the virtual volume is the page number of the virtual volume (divide a value indicated by the virtual capacity 2002 by a value indicated by the virtual page capacity (described below), and round-up the result).

The pointer 2005 to the pages in the cache address space in a pointer to information on a page in the cache address space 301 allocated to the virtual volume page. The pointer points, in the page number 2101 in the cache mapping information 2100, information on the page in the cache address space 301 which is allocated to the page of the virtual volume. That the page of the cache address space 301 is allocated to the page of the virtual volume means that the page is allocated.

The pointer 2006 to the page in the pool designates a pointer to page information 2500 of the pool page allocated to the page of the virtual volume. Since the storage apparatus 104 has the function of the virtual capacity, the real data writing into the page of the virtual volume serves as a trigger to the page allocation. The pointer 2006 designates, for example, a pool page first allocated to the page of the virtual volume. The pool page in which the newest data is stored for each block of the virtual page may be recognized from the management information of FIGS. 7, 8, and 9.

In correspondence with the virtual page to which the writing has not been performed, the pointer 2005 to the cache address space and the pointer 2006 to the page in the pool have a value of null (NULL or "0 (zero)").

For example, when designate the page #1 of the cache address space 301, the pointer 2005 to the page of the cache address space has a value of f, which is the head address of the page number #1 in the page number 2101 in the cache address space of the cache mapping information 2100. In the same way, when designate the page #2, the pointer 2005 to the page of the cache address space has a value of s.

The storage apparatus 104 allocates the storage area of the cache address space to the page of the virtual volume. There after, when the storage apparatus 104 allocates the page, a value is registered in the pointer 2006 to the page in the pool. The allocation of the storage area of the cache address space is later described in detail.

The virtual volume information 2000 in the embodiment retains the information on the pointer 2005 to the page of the cache address space and the pointer 2006 to the page in the pool, which is attained by managing which page in the pool is mapped to the each page of the virtual volume, or managing which storage area in the cache address space corresponds to the page of the virtual volume.

In the present embodiment, the page capacity of the virtual volume and the page capacity of the pool are not always equal to each other. This is because the page of the pool may possibly store therein the redundant data which differs depending on the RAID type. The page capacity of the pool is determined in accordance with the RAID type of the flash package group 115 to which the page is allocated.

For example, when data is written in a duplicated manner as in the case of RAID 1, the page capacity of the pool doubles as compared with the virtual page capacity. When redundant data having a capacity being equal to that of one storage device is stored in together with the data having a capacity of N storage device, as in the case of RAID 5, the page capacity is (N+1)/N of the virtual page capacity. Here, the one redundant data block and the N data blocks are called stripe group or stripe array.

Furthermore, the length of the each data block configuring the stripe group is called stripe size. When the parity data is not used, as in the case of RAID 0, the capacity of n pages of the virtual volume and the pool page capacity are equal to each other. In the present embodiment, the virtual page capacities are the same in one or more virtual volumes provided by the storage apparatus 104, however, pages of different capacities may be contained in the one or more virtual volumes.

FIG. 8 depicts a format example of the mapping information 2100 between the cache address space 301 and the LS cache address space 302. The storage areas (the address ranges) of the two address spaces are associated with each other by the block unit.

The page number 2101 depicts the number of the page (unit storage area) in the storage area of the cache address space (cache area). The block number 2102 depicts a number of the block configuring the page. The page number 2103 and the block number 2104 of the LS cache address space 302 designate the block, in the LS cache address space 302, which is associated with the block in the cache address space 301.

The page of the cache address space 301 (cache area) is associated with the virtual page of the virtual volume. Once the page of the cache address space 301 is allocated to the virtual page, the relationship therebetween is retained. When overwriting of data onto the virtual block of the virtual page is requested, the data is overwritten onto the corresponding block of the corresponding page in the cache address space 301.

In accordance with the overwriting onto the virtual block of the virtual page, data is newly written in another block in the LS cache address space 302 (LS cache area). Accordingly, the relationship between the block in the cache address space 301 and the block in the LS cache address space 302 changes. With the changed relationship between the blocks in the two cache areas, the storage apparatus 104 updates the page number 2004 in the pool of the virtual volume information 2000 in addition to the cache mapping information 2100.

FIG. 9 depicts a format example of the mapping information 2200 between the cache and the pool. The mapping information 2200 between the cache and the pool manages the mapping between the page number of the LS cache address space and the page number of the pool address space. The mapping information 2200 between the cache and the pool designates the relationship 347 in FIG. 5. Specifically, the page number 2201 in the LS cache address space designates the page number in the LS cache address space 301. The pointer 2202 to the page in the pool stores a pointer to the page information 2500 on the page corresponding to the page number in the LS cache address space 301.

Figure 10:
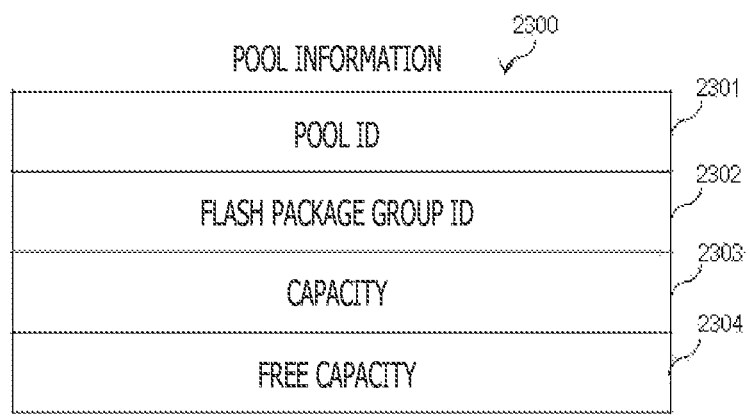
FIG. 10 depicts a format example of pool information.

FIG. 10 depicts a format example of the pool information 2300. Although the pool information 2300 may include pieces of pool information, depicted in FIG. 10 is information on one pool. The pool information 2300 includes a pool ID 2301, a flash package group ID 2302, a capacity 2303, and a free capacity 2304.

The pool ID 2301 indicates the ID of the pool. The flash package group ID 2302 indicates the flash package group 115 configuring the pool. The capacity 2303 indicates the memory capacity of the pool. The free capacity 2304 indicates the memory capacity available in the pool.

Figure 11:
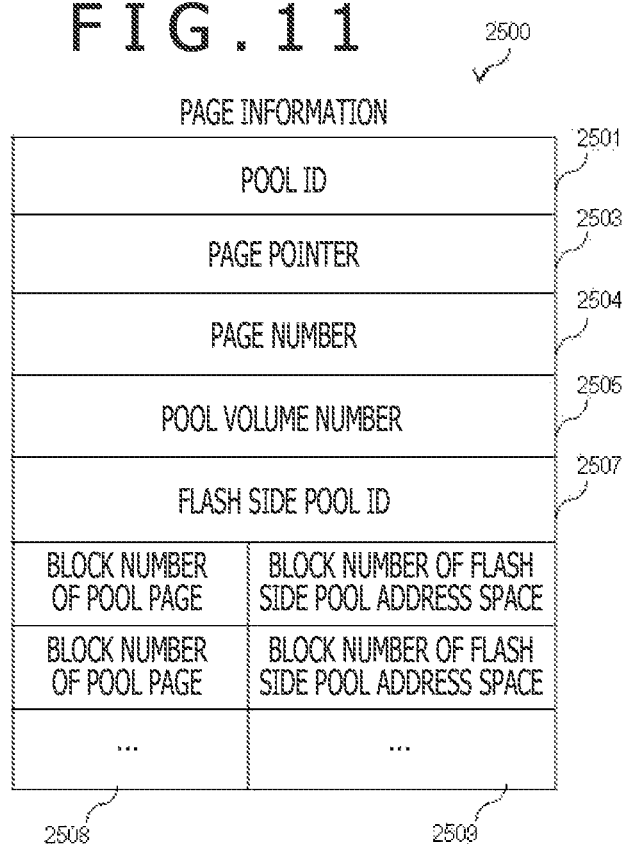
FIG. 11 depicts a format example of page information.

FIG. 11 depicts a format example of the page information 2500. Although the page information 2500 is management information on a plurality of pages in the pool, depicted in FIG. 11 depicts page information on one page. The page information 2500 includes a pool ID 2501, a page pointer 2503, a page number 2504, a pool volume number 2505, a page number 2506, a flash side pool ID 2507, a block number 2508 of the pool page, and a block number 2509 of the flash side pool address space.

The pool ID 2501 indicates an ID of the pool to which the page belongs. The page pointer 2503 is used when cue-managing the blank page in the pool. The pool volume number 2505 indicates a pool volume in which the page is included. The page number 2504 indicates a number in the pool volume.

The flash side pool ID 2507 indicates a flash side pool 304 including a flash side address space 352 associated with the pool indicated by the pool ID 2501. In the case where one pool 303 and one flash side pool 304 are provided, this information is omitted.

The block number 2508 of the page indicates a block number of the page in the pool address space. The block number 2509 of the flash side pool address space indicates a block number of the flash side pool address space associated with the block number of the page. The relationship between these block numbers is indicated by a numeral 348 in FIG. 5.

This association or allocation is conducted at a timing of initial setting of the storage apparatus 104. The page information 2500 on the pool volume added during the system operation is generated when the pool volume is added.

Note that, in order to map between a page in the pool address space and a page in the flash package address space, it is enough that the page information 2500 manages the page number of the flash package address space. Since the access unit to the flash memory is smaller than the page size in the most cases, the mapping is managed by the block unit in the present embodiment. The mapping by the segment unit can also be managed in the similar way.

Figure 12:
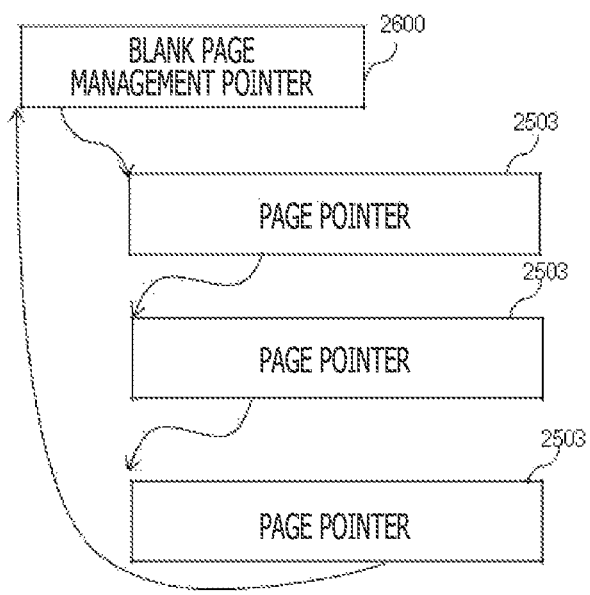
FIG. 12 depicts an example of a blank page management pointer of the page in the pool space.

FIG. 12 depicts an example of the blank page management pointer 2600 in the page of the pool 303. The blank page and the unavailable page is managed by the cue. FIG. 12 depicts a collection of blank pages managed by the blank page management pointer 2600. The blank page means a page which is not allocated to the virtual page. The page information 2500 relating to the blank page is called blank page information. The blank page management pointer 2600 points the address of the head blank page information 2500. Next, the page pointer 2503 pointing the blank page in the top page information 2500 points the next blank page information 2500.

In FIG. 12, the blank page pointer 2503 of the last blank page information 2500 points the blank page management pointer 2600, however, may points a null value. Upon receiving a write request onto a virtual page to which the page is not allocated, the storage controller 109 searches from the blank page management pointer 2600 for any page in the flash package group 115 which is the same as the virtual volume RAID type 2003 of the virtual volume, for example, a blank page of the flash package group 115 having largest number of blank pages. After that, the storage controller 109 allocates the searched blank page to the virtual page.

One or more blank page management pointers 2600 are provided for one pool. For example, the blank page management pointers 2600 are provided for every pool volumes.

The storage controller 109 allocates the blank page 2500 to a page of the LS cache address space 302, and then updates the page pointer 2503 of a blank page which is the preceding page of the allocated page. Specifically, the storage controller 109 changes the page pointer 2503 of the page information 2500 on the preceding blank page to the page pointer 2503 of the allocated page. The storage controller 109 further subtracts the capacity of the allocated page from the value of the free capacity 2304 of the corresponding pool information 2300 to update the value of the free capacity 2304.

Figure 13:
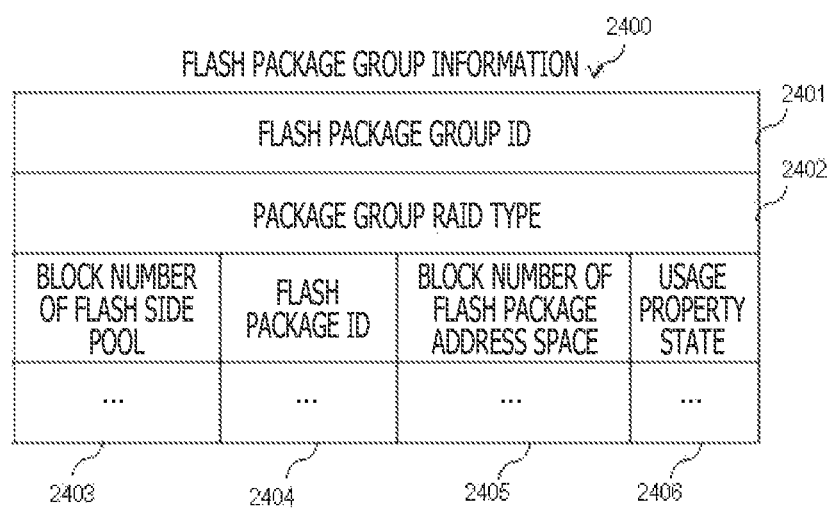
FIG. 13 depicts one format example of flash package group information.

FIG. 13 depicts a format example of the flash package group information 2400. The flash package group information 2400 manages the mapping between the flash side pool address space and the flash package address space. The format example of the flash package group information 2400 is depicted. The flash package group information 2400 may include a plurality of pieces of information on flash package group 115, however, FIG. 13 depicts a case where one piece of information on flash package group 115 is included.

The flash package group information 2400 designates a flash package group ID 2401, a package group RAID type 2402, a flash side pool block number 2403, a flash package number 2404, a block number 2405 of the flash package address space, and a usage property state 2406. The flash package group information 2400 indicates the relationship 345 in FIG. 5.

The flash package group ID 2401 indicates an identifier of the flash package group 115. The package group RAID type 2402 indicates a RAID type of the flash package group 115.

The flash side pool block number 2403 is a number of a block which is a management unit of the address space of the flash package group. The flash package ID 2404 indicates an identifier of the flash package that constitutes the flash package group.

The block number 2405 of the flash package address space is a block number of the flash package address space which is mapped to the each address indicated by the flash side pool block number 2403.

The usage property state 2406 indicates that the usage (mapping) of the value of the block number 2405 of the flash package address space is permitted or prohibited. The block number already mapped or before mapped is a block number usage of which is permitted.

As described after, with the UNMAP command being issued, the block number of the flash package address space changes to a state in which the usage is prohibited. Description for the UNMAP command is made later. The usage of an unallocated block number which is added by expansion of the flash package address space 362 is permitted.

Figure 14:
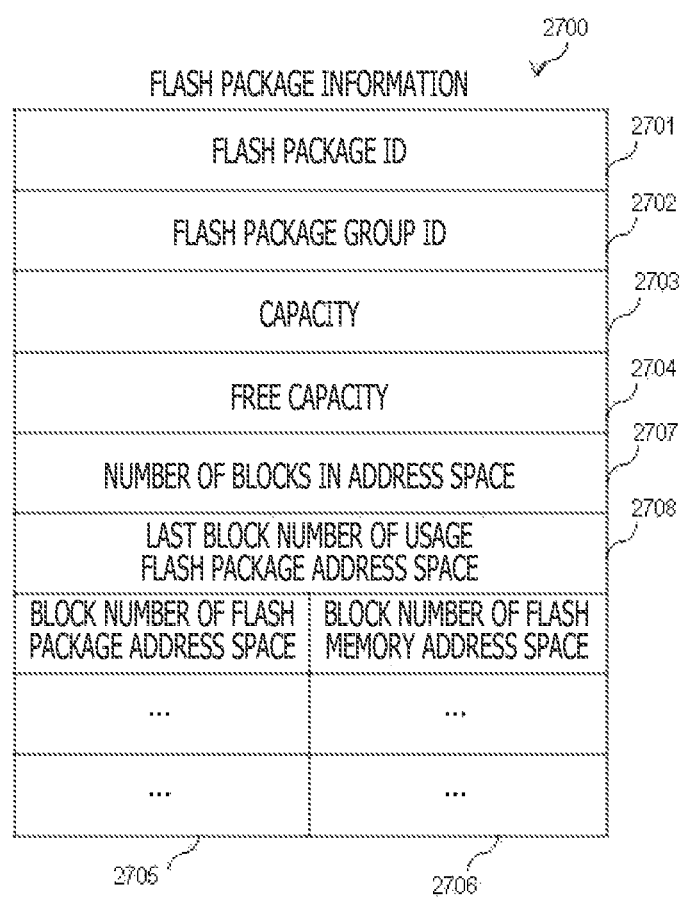
FIG. 14 depicts one format example of flash package information.

FIG. 14 depicts a format example of the flash package information 2700. The flash package information 2700 manages the mapping between the flash package address space and the address space of the flash memory. The flash package information 2700 is managed in each flash package and stored in the memory 214. The storage controller 109 cannot access the flash package information 2700.

The flash package information 2700 indicates a flash package ID 2701, a flash package group ID 2702, a capacity 2703, a free capacity 2704, a block number 2705 of the flash package address space, a block number 2706 of the flash memory address space 2706, a number-of-address-space-blocks 2707, and a last block number 2708 of the usage flash package address space.

The flash package ID 2701 indicates the ID of the flash package 113. The flash package group ID 2702 indicates the flash package group 115 to which the flash package 113 belongs. The capacity 2703 indicates the real capacity of the flash package 113 (flash memory). The value of the capacity 2703 does not change when the flash package address space is expanded.

The free capacity 2704 indicates a real capacity of an area into which data can be written. The free capacity indicates a value obtained by subtracting a value of the capacity of an area for storing data and a value of the capacity of the garbage from the value of the capacity 2703. The value of the free capacity 2704 does not change when the flash package address space is expanded. The value of the free capacity 2704 increases by erasing the garbage data.

The block number 2705 of the flash package address space is a number of the address space which manages the capacity of the flash package by the block unit. The block number 2706 of the flash memory address space is a number of the address space which manages the capacity of the flash memory by the block unit.

The block number 2706 of the flash memory address space is information that indicates the storing position of the physical flash memory which is associated with the block number 2705 of the flash package address space. When data is first stored in the free block in the flash package address space, allocated to the block number is a block number of the flash memory address space in which the data is actually stored.

The number-of-address-space-blocks 2707 indicates a number of the blocks configuring the flash package address space. Specifically, the number-of-address-space-blocks 2707 indicates the last number of the block number of the flash package address space. The value of the number-ofaddress-space-blocks 2707 is referred when expanding the flash package address space described later.

In the flash package address space, a large capacity (virtual capacity) is prepared beforehand so as to expand the flash package address space. For example, the initial value of number-of-address-space-blocks 2707 is 1000, and a capacity corresponding to 3000 blocks is prepared for the flash package address space.

When starting up the storage apparatus 104, the capacity of the flash package address space is set to 1000 blocks 1000. In other words, block numbers up to 1000 are defined in the flash package address space.

When expanding the flash package address space during operation, the storage apparatus 104 adds the number of the blocks to be expanded to the current number of the blocks. For example, if the number of the blocks to be expanded is 1000, the storage apparatus 104 updates the value of number-of-address-space-blocks 2707 to 2000 from 1000, to thereby reset the available block numbers.

Note that it is also possible to use either one of the pool 303 and the flash side pool 304. For example, the storage apparatus 104 uses only the flash side pool 304. In this case, the LS cache address space 302 and the flash side pool address space 352 may be managed not by the block unit, but by the page unit. The page information 2500 in turn becomes unnecessary. The pointer to the page number of the flash address space, that is 2400, may be stored in 2200.

(6) Capacity Expansion Processing

Figure 15A:
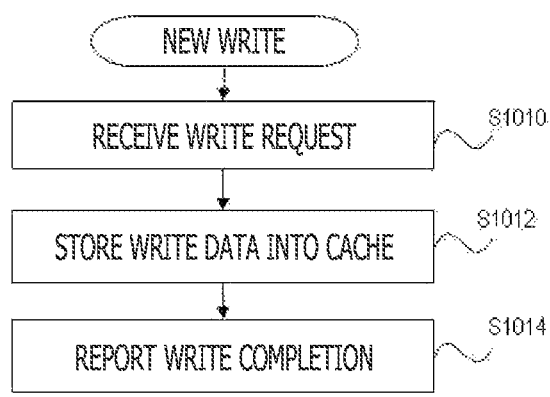
FIG. 15A depicts a processing (new write processing) flow when the storage apparatus received from a host for the first time a write request on the virtual page for the virtual volume.
Figure 15B:
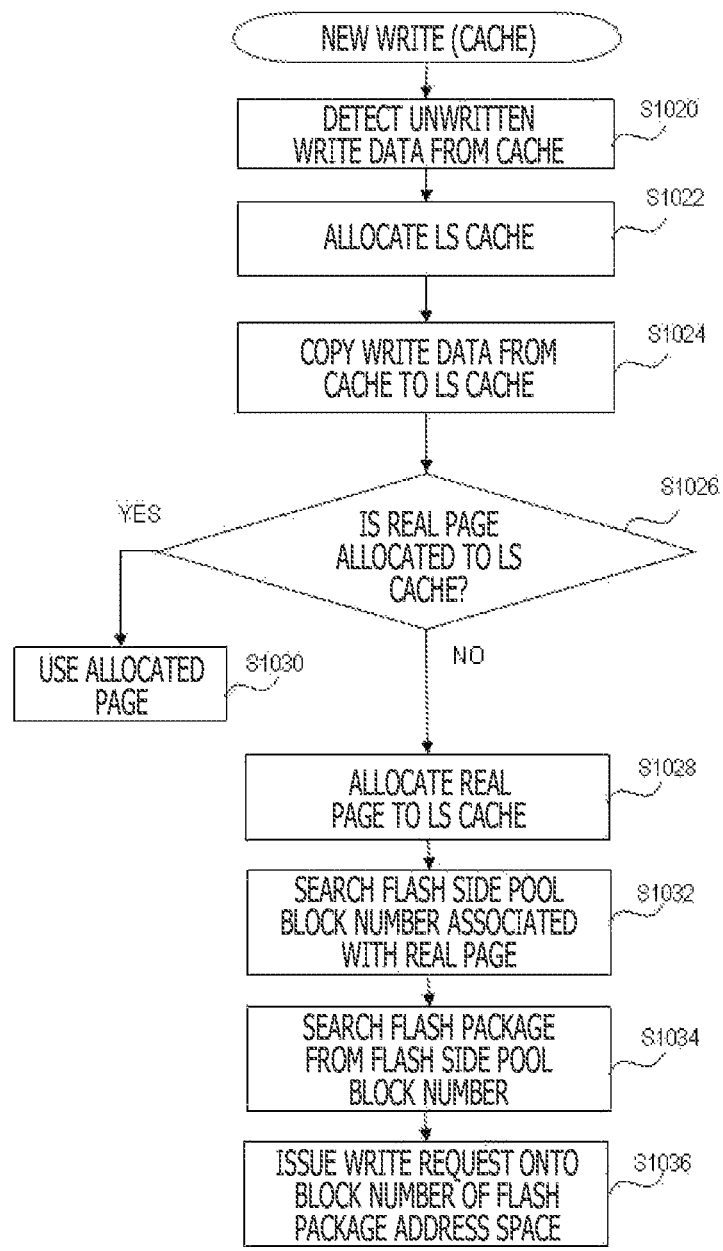
FIG. 15B depicts a flow of the new write processing.
Figure 15C:
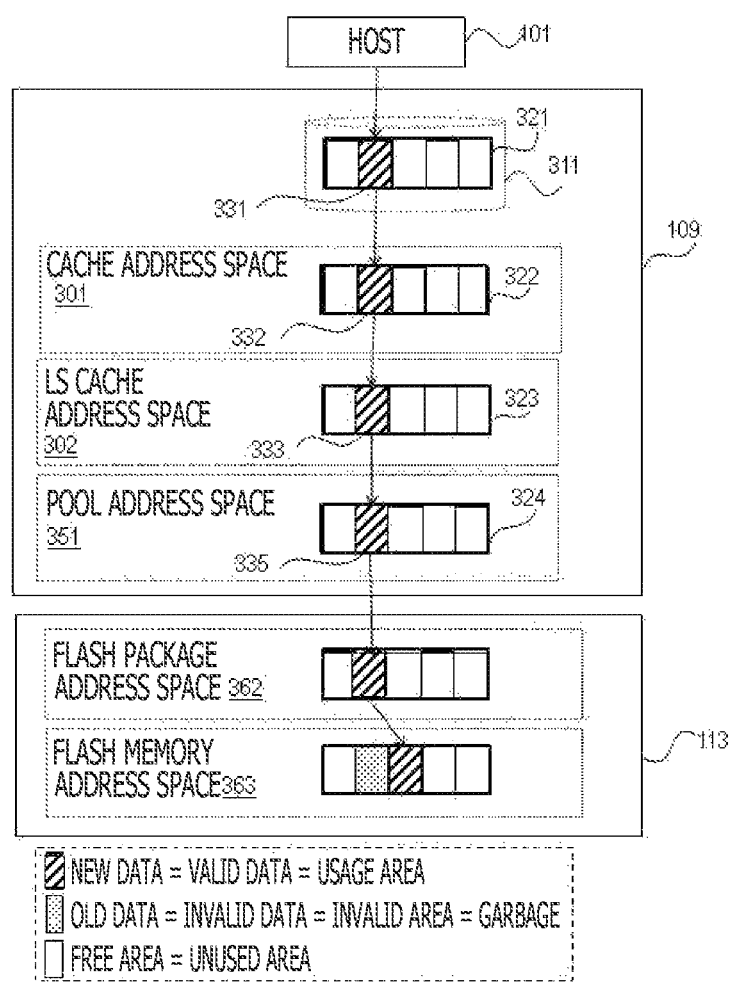
FIG. 15C depicts a data flow in the new write processing.

The processing by the storage apparatus 104 is hereinafter described with referring the configuration in FIG. 5 as an example. FIGS. 15A and 15B depicts a flow of processing (new write processing) when the storage apparatus 104 receives at first time from the host 101 a write request onto the virtual page for the virtual volume. FIG. 15C depicts a data flow in new write processing.

FIG. 15A depicts a processing flow for the host 101. The storage apparatus 104 receives the write request from the host 101 (S1010). The write request issued by the host 101 includes an identification number of the virtual volume onto which the write data is written and information on write-in position of the write data (a host logical block address (LBA) on the virtual volume and the data length) in the writing destination. Hereinafter, the LBA assigned to the block of the volume (virtual volume) provided to the host by the storage apparatus may be called "host LBA."

The storage controller 109 analyzes the write request to obtain the address of the virtual volume concerning the write request. The processor 119 maps an address area in the cache address space 301 to the obtained address, and stores (writes) the write data send from the host 101 into the storage area corresponding to the address area (S1012).

As depicted in FIG. 15C, the block (storage area) 332 of the page (storage area) 322 in the cache address space 301 (cache area) is allocated to the block (storage area) 331 of the virtual page 321 in the virtual volume 311 that is the target of the write request.

Referring back to FIG. 15A, when the writing of the write data into the cache memory 110 has completed, the storage controller 109 sends to the host 101 a completion report of the write request (S1014).

FIG. 15B depicts a flow of processing cache data by the storage apparatus 104. The storage controller 109 monitors the cache memory 110. When write data which has not been written into the flash package 113 is detected (S1020), the storage controller 109 maps the block in the LS cache address space 302 to the block in the cache address space 301 (S1022). In FIG. 15C, the block 333 of the page 323 in the LS cache address space 302 is allocated to the block 332 in the cache address space 301.

Referring back to FIG. 15B, the storage controller 109 copies the write data from the cache address space 301 to the LS cache address space 302 (S1024). The storage controller 109 determines whether the page in the pool address space 351 is allocated to the page 323 in the LS cache address space 302 (S1026).

When the page in the pool address space 351 is not allocated to the page 323 in the LS cache address space 302 (NO in S1026), the storage controller 109 selects the blank page 324 (see FIG. 15C) from the blank page management information pointer 2600, and allocates the selected blank page 324 to the page 323 in the LS cache address space 302 (S1028).

The storage controller 109 stores, in the mapping information 2200 between the cache and the pool, the number of the page 323 in the LS cache address space 302 and the pointer to the allocated page.

When the page in the pool address space 351 is allocated to the page 323 in the LS cache address space 302, that is, when the number of the page 323 in the LS cache address space 302 and the pointer to the allocated page 324 are registered in the mapping information 2200 between the cache and the pool, then the storage controller 109 uses the allocated page (S1030).

In FIG. 15C, the page 324 in the pool address space 351 is allocated. If the mapping is determined between pages, the mapping between the blocks in the pages is also determined. The block 333 in the LS cache address space 302 and the block 335 in the pool address space 351 have the mapped relationship.

The storage controller 109 searches, in the page information 2500 of the allocated page in the pool address space 351, the value of the flash side pool block number 2509 mapped to the value of the writing target page block number 2508 (S1032).

The storage controller 109 searches, in the flash package group information 2400, a pair values of the flash package ID 2404 and the block number 2405 of the flash package address space, which are associated with the flash side pool block number found in step S1032 (S1034).

The storage controller 109 issues a write request onto the block number of the found flash package address space to the flash package 113 found in step S1034 (S1036). In the example in FIG. 15C, all blocks in one page are mapped with one flash package 113.

When the page of the pool 303 is allocated to the page of the LS cache (LS cache address space 302), the page of the flash side pool 304 is determined uniquely. The storage controller 109 may execute the compression processing or the duplication elimination processing at the time of performing copy from the cache address space 301 (cache area) to the LS cache address space 302 (LS cache area).

Upon receiving the write request, the flash package 113 temporarily stores the write data into the buffer in the flash package 113, and then returns the write completion report. The flash package 113 executes a processing of storing data into the flash memory in the flash package 113 in an unsynchronized manner with the write request issued in step S1032.

The flash package 113 allocates the free block number of the flash memory address space to the designated block number of the flash package address space. The flash package 113 stores the write data into the storage area of the flash memory corresponding to the allocated block number. The flash package 113 newly allocates a real block, and updates the value of the free capacity 2704 of the flash package information 2700. The processing of FIG. 15B may be executed by the segment unit which is the access unit to the flash memory.

Figure 16A:
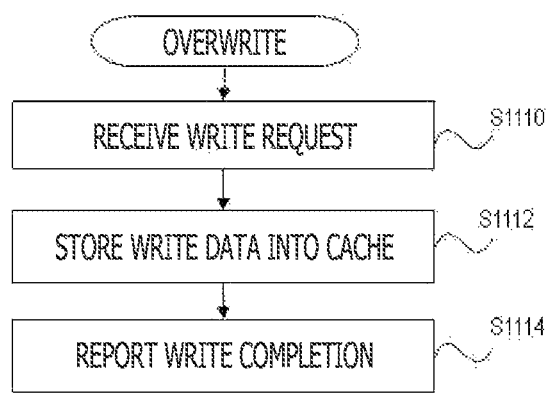
FIG. 16A depicts a processing (overwrite processing) flow when the storage apparatus received from the host an overwrite request on the virtual page for the virtual volume.
Figure 16B:
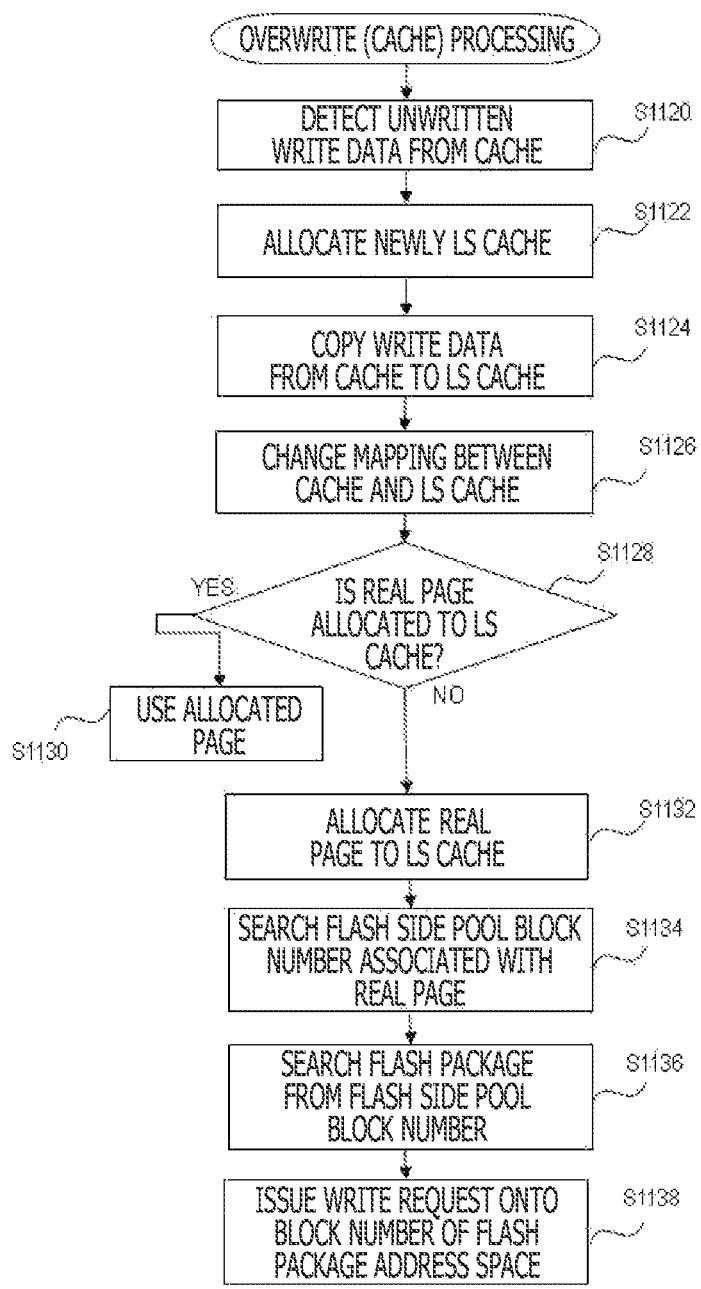
FIG. 16B depicts a flow of the overwrite processing.
Figure 16C:
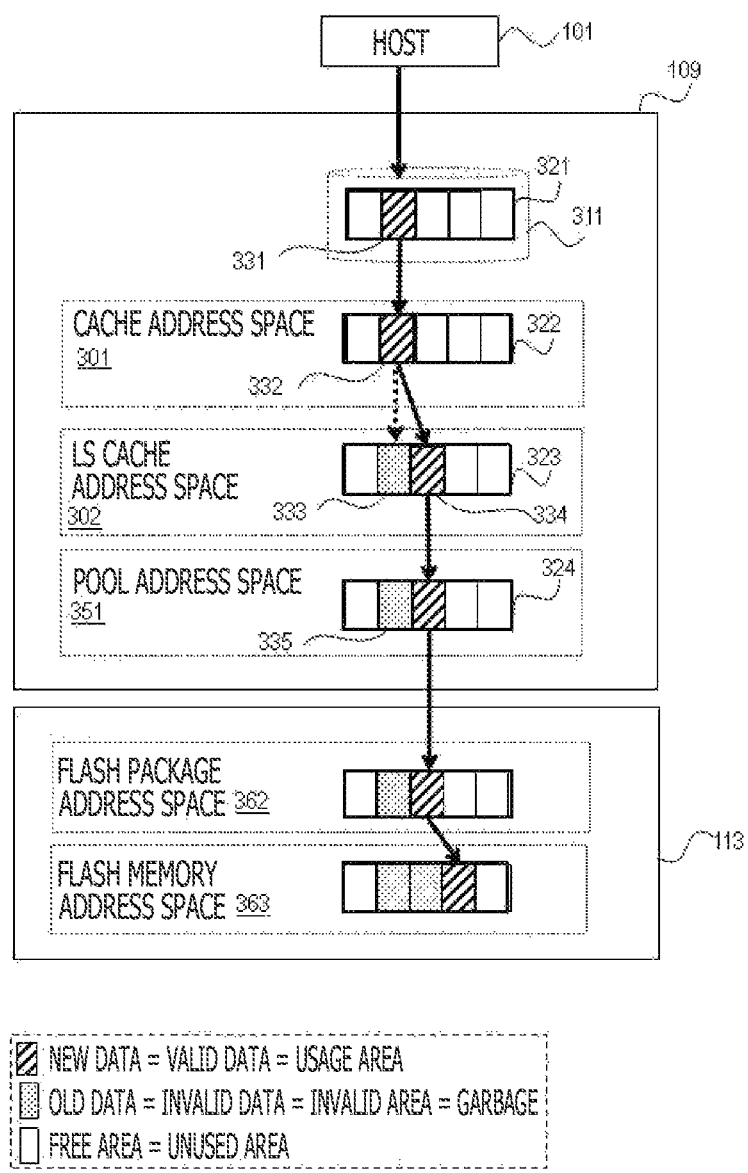
FIG. 16C depicts a data flow in the overwrite processing.

Next, described is the overwrite processing, which occurs in the case where a write request is issued again for a place to which a write request has once issued. FIGS. 16A and 16B each depicts a flow of processing (over write processing) when the storage apparatus 104 receives from the host 101 the overwrite request on the virtual page to the virtual volume. FIG. 16C depicts a data flow in the overwrite processing.

FIG. 16A depicts the processing flow for the host 101. The storage apparatus 104 receives the write request from the host 101 (S1110). The storage controller 109 analyses the write request to obtain the address of the virtual volume concerning the write request. The processor 119 stores (writes) the write data send from the host 101 into the area 322 allocated to the address obtained in the cache address space 301 (S1112).

As depicted in FIG. 16C, the block 332 of the page 322 in the cache address space 301 is already allocated to the block 331 of the virtual page 321 in the virtual volume 311 which is the writing target. The new write data is overwritten on the previous data of the block 332.

Referring back to FIG. 16A, when the writing of the write data into the cache memory 110 has completed, the storage controller 109 sends to the host 101 a completion report of the write request (S1114).

FIG. 16B depicts a flow of processing cache data by the storage apparatus 104. When write data which has not been written into the flash package 113 is detected (S1120), the storage controller 109 maps the block in the LS cache address space 302 to the block in the cache address space 301 (S1122). In FIG. 16C, the block 334 of the page 323 in the LS cache address space 302 is allocated to the block 332 in the cache address space 301.

The allocated block in the LS cache address space 302 is not the block 333 (storage area) same as the previous time, but a block (storage area) into which the write data has never been stored, that is, the unused block. For example, a storage area following the last used storage area is allocated.

Referring back to FIG. 16B, the storage controller 109 copies the write data from the cache address space 301 to the LS cache address space 302 (S1124). The storage controller 109 writes the write data into the newly allocated unused block 334. In other words, the storage controller 109 adds the write data to the LS cache area. The storage controller 109 manages the block 333 storing the old data as the invalid area. This area is the garbage onto which data cannot be written newly. The garbage is released in accordance with erasure of data in the flash memory.

The write data is valid data, and the storage area storing the write data is the usage area. The storage area into which the write data has never stored is a free area, and is a unused area. When data is updated after the write data is stored, the data becomes old data. This is the invalid data. The storage area into which the data has been stored is the invalid area and is the garbage.

The storage controller 109 changes the cache mapping information 2100 which manages the mapping between the cache address space 301 and the LS cache address space 302 (S1126). The storage controller 109 changes the block corresponding to the block 332 from the block 333 to the block 334.

The following steps S1128 to S1138 are similar as the steps S1026 to S1036 in FIG. 15B. For the new block 334 in the LS cache address space 302, new blocks in the pool address space 351, the flash package address space 362, and the flash memory address space 363 are allocated.

Figure 17A:
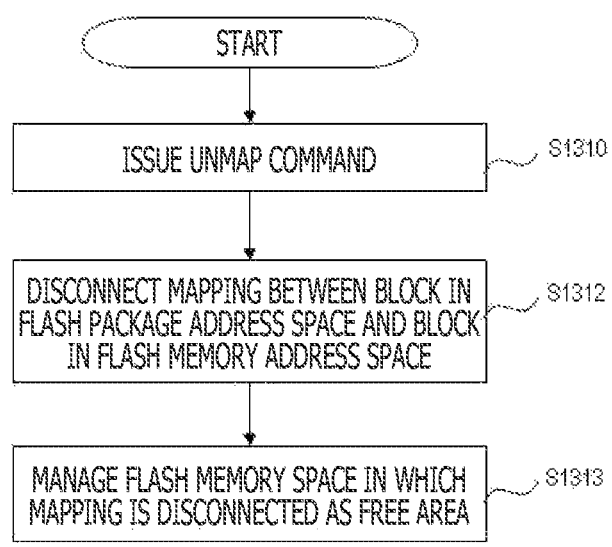
FIG. 17A depicts a processing when an UNMAP command is issued.
Figure 17B:
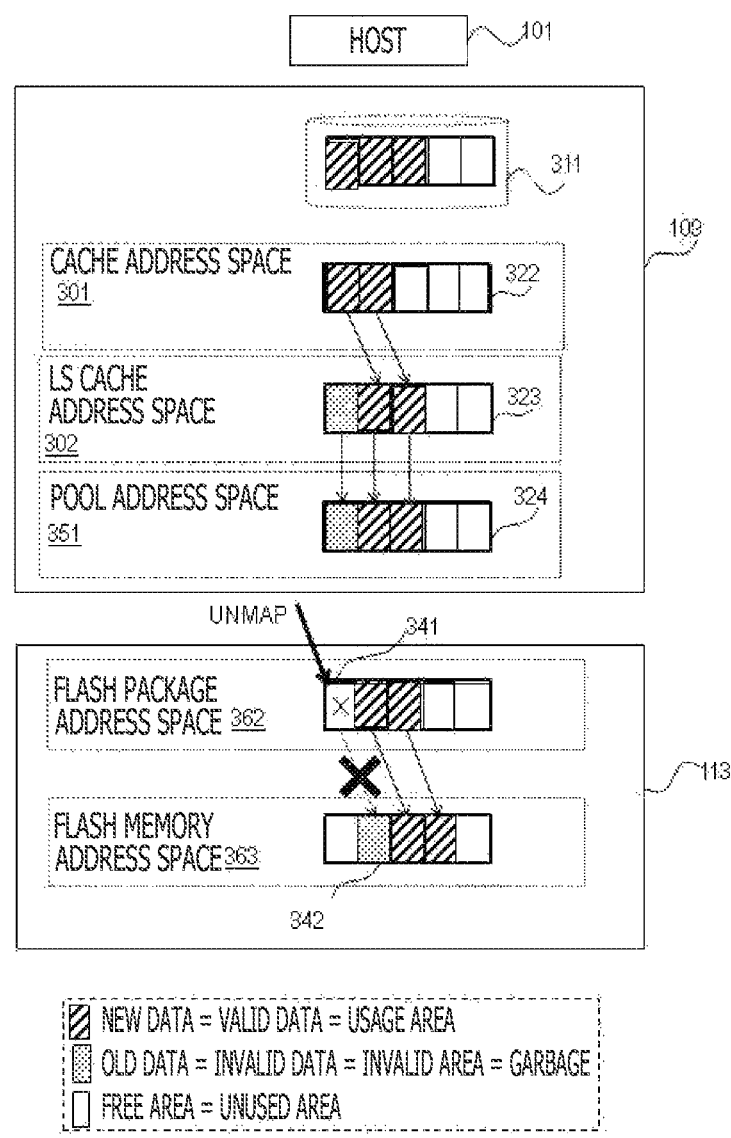
FIG. 17B depicts a processing when an UNMAP command is issued.

Next, the processing of the UNMAP command is described. The storage controller 109 issues the UNMAP command to the address area of the flash package address space 362 which stores unnecessary data. FIGS. 17A and 17B each depicts a processing when the UNMAP command is issued. The UNMAP command is a command for releasing the designated storage area to make the storage area into free area. FIG. 17A depicts the processing flow of the UNMAP command, and FIG. 17B depicts removal of the mapping by the UNMAP command.

As depicted in FIG. 17A, the storage controller 109 issues the UNMAP command to the flash package 113 (S1310). The UNMAP command designates the block in the flash package address space 362. In FIG. 17B, the UNMAP command designates the block 341 in the flash package address space 362. As described above, in the present embodiment, the block is the data erasure unit for the flash memory and also is the mapping unit between the flash package 113 and the pool 303, in other words, is the I/O unit from the storage controller 109.

As depicted in FIGS. 17A and 17B, the flash package 113 (processor 213) removes the mapping between the block 341 in the flash package address space 362 designated by the UNMAP command and the block 342 in the flash memory address space 363 (S1312).

The flash package 113 searches, in the block number 2705 of the flash package address space of the flash package information 2700, the number designated by the UNMAP command. The flash package 113 registers "0" to the cell of the block number 2706, which is associated with the block number 2705, in the flash memory address space. The registered value may be NULL or a value equal to that in the initial state instead of "0."

By removing the mapping relationship, the block 342 in the flash memory address space 363 is changed into the garbage. The processor 213 of the flash package 113 responds to the storage controller 109 that the UNMAP command has completed. The storage controller 109 manages the block 341 in the flash package address space 362, which is the UNMAP target, as an area usage of which is prohibited, and prohibits an I/O with this area.

The storage controller 109 uses the usage property state 2406 of the flash package group information 2400 to manage the unusable address area in the flash package address space 361. The storage controller 109 sets the value of the usage property state 2406 to "NO" in the entry of the block designated by the UNMAP command.

The block 342, which is mapped to the block 341 designated by the UNMAP command, in the flash memory address space 363 is the garbage. The flash package 113 erases the data of the garbage block 342 and manages the block 342 as an usable free block (S1313).

For example, the flash package 113 can manage free blocks in the flash memory address space with using the pointer in a manner similar to that in the management of the blank page described with referring to FIG. 12. When the garbage is changed into the free area, the flash package 113 updates the value of the free capacity 2704 of the flash package information 2700.

Next, described is a procedure for collecting the garbage (free area) generated in the flash memory and providing continuous free areas in the flash package address space 362. As described above, the UNMAP command designates the block in the flash memory address space 363. This block is prohibited from being used. The unavailable blocks exist discretely in the flash memory address space 363.

The storage controller 109 manages the virtual volume by the page unit, while requiring a free area of a page size in the flash memory address space 363. The storage apparatus 104 adds a new area in the flash package address space 362, and thereby can create continuous areas needed for the page. The free area converted from the garbage in the flash memory is reallocated to a page newly allocated to the pool in the expanded flash package address space 362.

The storage apparatus 104 also expands the pool address space 351 in accordance with the expansion of the flash package address space 362. Owing to this, the free area can be effectively created without performing garbage collection involving the data movement via the cache data by the storage controller 109.

Figure 18A:
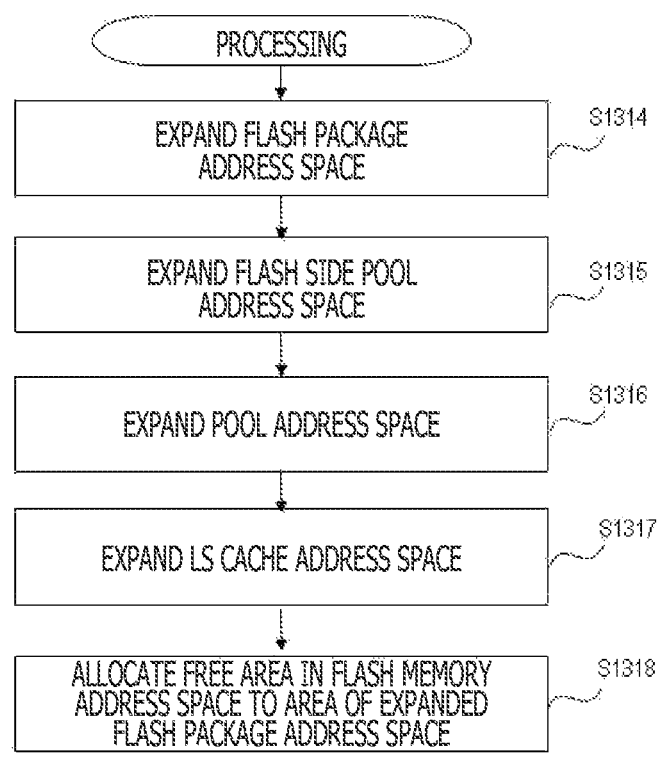
FIG. 18A depicts expanding a plurality of address spaces and reallocating a free area of the flash memory to the added address space.
Figure 18B:
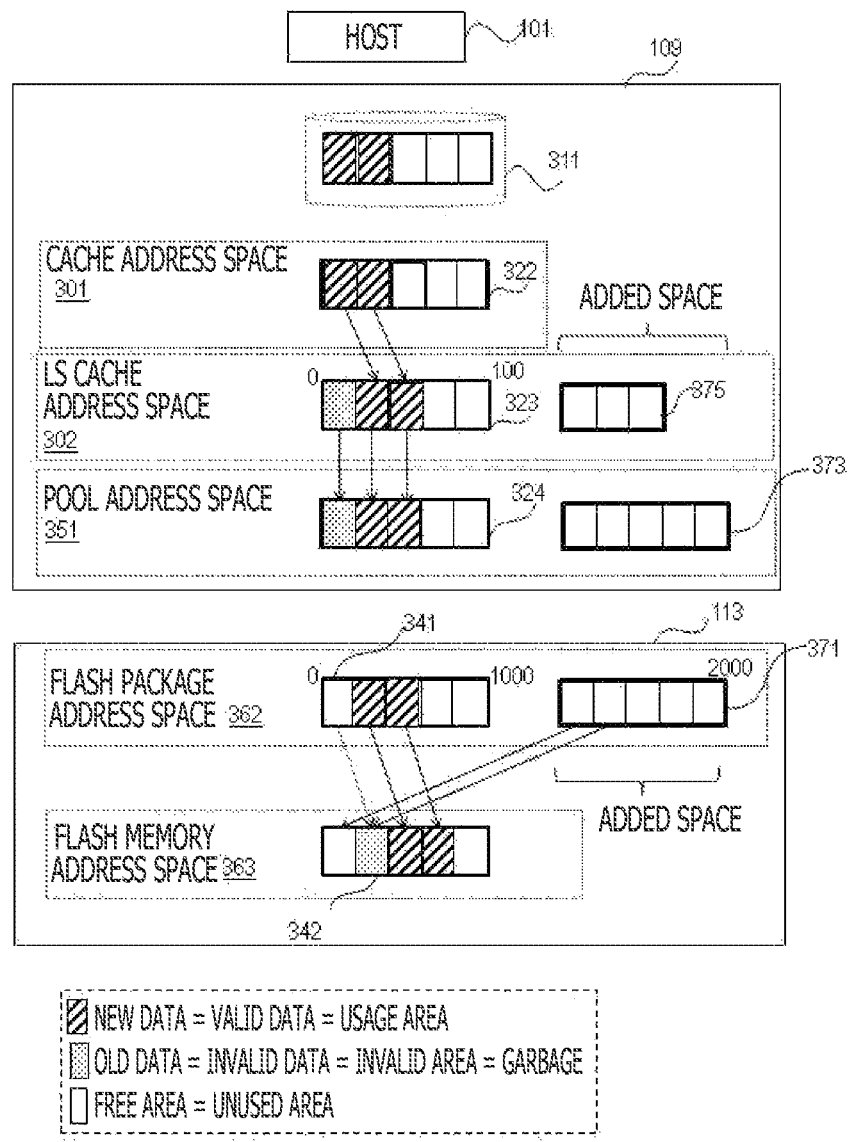
FIG. 18B depicts expanding a plurality of address spaces and reallocating a free area of the flash memory to the added address space.

FIGS. 18A and 18B depict the reallocation of the free area of the flash memory to the expanded and added address space of the plurality of address spaces. FIG. 18A depicts a flow chart in expanding and mapping the plurality of address spaces. FIG. 18B depicts relationships between the plurality of hierarchical address spaces and the free areas of the flash memory.

As depicted in FIG. 18A, the storage controller 109 expands the flash package address space 362 (S1314). For example, the storage controller 109 refers to each of the free capacities of the flash packages 113 in the package group 115. When the least free capacity reaches a prescribed value, the storage controller 109 determines to increase the virtual capacity of each flash package 113 in the package group 115. Owing to this, the shortage of the free capacity in the package group 115 can be effectively avoided.

The storage controller 109 determines the capacity to be added. For example, the storage controller 109 determines the capacity to be added to the flash package address space 362 in accordance with the expression: (100–x) %×y %. The values x and y are set by a user or preset in the device. The free capacity is a capacity which does not include the garbage, and into which data can be written. The increasing capacity is larger than the page size, and for example, the starting condition of the capacity addition and added capacity, which is larger than the total capacity of the garbage, may be determined in accordance with the amount of the address areas in which the mappings are removed by the UNMAP command.

The storage controller 109 sends an expansion request of the flash package address space 362 to each flash package 113 of the package group 115. The expansion request designates the capacity to be increased.

The flash package 113 expands the flash package address space 362 in accordance with the instruction from the storage controller 109. The flash package 113 updates the flash package information 2700. Specifically, the flash package 113 increases the value of the number-of-address-space-blocks 2707 so as to match with the expanded flash package address space 362. By expanding the flash package address space, the capacity of the flash package can be seen as if it is increased.

The flash package 113 adds the block number of the added address space to the block number 2705 of the flash package address space. Each of the values of the block number 2706 of the associated flash memory address space is an initial value. In other words, the flash package 113 just expands the flash package address space 362, but does not maps the added address to the flash memory address space 363.

Referring to FIG. 18B, the flash package address space 362 is expanded, and the capacity thereof is increased from 1000 blocks to 2000 blocks. FIG. 18B depicts one flash package address space 362, however, the address space is expanded in each flash package 113 of the package group 115. The added capacities are common in the above embodiment, however, the capacities may be different between the packages.

When the flash package address space of the flash package 113 is expanded, the storage controller 109 manages the memory hierarchy in the manner similar to that in adding flash memories. The storage controller 109 adds a new space 373 to the flash side pool address space 352 in accordance with the expansion of the flash package address space, to thereby expands the flash side pool address space 352 (S1315).

The storage controller 109 updates the flash package group information 2400. The storage controller 109 adds the entry of the block in the added flash package address space to flash package group information 2400. The storage controller 109 adds a new number at the flash side pool block number 2403. The value of the usage property state 2406 is "available."

Then, in accordance with the expansion of the flash side pool address space 352, the storage controller 109 adds the address area 375 to the pool address space 351 to expand the pool address space 351 (S1316). The storage controller 109 generates a new pool volume corresponding to the increased capacity of the flash side pool address space 352, and adds the new pool volume to the pool 303. Owing to this, free areas are ensured by the compaction, and continuous free areas 375 are provided to the host 101. The storage controller 109 generates the page information 2500 of the page in the newly added pool volume.

Then, the storage controller 109 expands the LS cache address space 302 (S1317). The storage controller 109 not only adds an address area, but also a physical storage area, to the LS cache area. Data is added in the LS cache area. Due to this, an unavailable garbage generates on the cache memory. By adding the physical storage area of the LS cache, the LS cache area (free area) which can be used in accordance with the expansion of the pool address space 351 is preferably increased. The addition of the storage area to the LS cache area increases the continuous storage areas.

The garbage in the flash memory address space 363 is mapped to the address area added in the flash package address space 362 (S1318). Upon receiving the write request, the flash package 113 maps the garbage to the flash package address space 362 at the time of writing the write data onto the flash memory.

Referring to FIG. 18B, the garbage block 342 in the flash memory address space 363 is mapped to the block in the added space 371 in the flash package address space 362. The flash package 113 updates the flash package information 2700 in accordance with the mapping. Note that the garbage block 342 can be mapped to any free areas in the flash package address space 362 after being expanded.

To utilize the block 342 in the flash memory address space as the free area, the flash package 113 erases the data of the block 342. As described above, the block is the erasure unit for the flash memory.

As described above, by expanding the flash package address space 362, discrete address areas can be collected and wide continuous areas can be created. The free areas collected in the flash memory are reallocated to the continuous address areas which are greater than the page size in the flash package address space 362, and then provided to the host 101. This can reduce a load caused by data movement via the LS cache and by mapping change involved in the garbage collection processing for ensuring the free capacity.

Note that the storage controller 109 may at first expand the pool address space 351, then may expand the LS cache address space 302, and further may expand the flash package address space 362.

In place of the storage controller 109, the flash package 113 may start the expansion of the flash package address space. The flash package 113 retains information on other flash packages 113 constituting the package group 115, and informs the other flash packages 113 about the expansion of the address space.

The flash package 113 may inform the storage controller 109 about the expansion of the address space. The storage controller 109 may instruct the other flash packages 113 constituting the RAID group to expand the flash package address space 362. In accordance with the information, the other flash packages 113 expand the flash package address space 362.

In the above embodiment, the unit for the erasure processing and the unit designated by the UNMAP command are the block. In the case where the UNMAP command designates the segment, the flash package 113 first copies and saves valid segment data in the erasure target block to another new block, and then erases the data in the block. The processing is conducted in background in an asynchronous manner with the processing by the storage apparatus 104.

The above embodiment also expands the flash package address space 362 of the flash package constituting the RAID. Depending on the design, the flash package address space 362 may be expanded for each flash package 113. In the case where the flash package 113 is not included in the RAID group, only the flash package address space 362 of that flash package 113 may be expanded. One volume is provided from the storage area of the flash package 113.

(7) Parity Recalculation

Suppose that the UNMAP command for creating the free area indicates an address &a1 in the flash package address space 362. A storage area designated by an address &a2, which is to be mapped to the address &a1, in the flash memory address space 363 stores data A. The storage controller 109 manages the address &a1 as the available address.

In other words, the storage controller 109 recognizes that the data A has been updated to 0 data by the UNMAP command. In fact, however, the storage area designated by the address &a2 still stores therein data A that is the old data. Accordingly, the parity generated from the stripe array in the flash package group 115 including the storage area &a2 storing data A needs to be recalculated and updated to a value assuming that the data in the storage area &a2 is the 0 data.

Conventionally, the storage controller 109 issues, before issuing the UNMAP command, a command of reading the old data needed for parity recalculation from the area designated by the UNMAP command. The flash package 113 returns the old data to the storage controller 109. After that, the storage controller 109 issues the UNMAP command to the flash package 113.

Then, the storage controller 109 issues a read command to the flash package 113 storing the parity in order to read out the old parity value needed for parity recalculation. The flash package 113 returns the old parity value. The storage controller 109 calculate a new parity by using the old data and the old parity. The storage controller 109 issues a write command to store the new parity.

The present embodiment provides a method for improving the performance by reducing the number of times of command issuance at the time of parity recalculation. The present embodiment defines an expansion UNMAP command with respect to the flash package 113 for updating the parity. The expansion UNMAP command instructs the flash package 113 to return stored data in the designated range in the flash package address space 362, and then to execute the UNMAP processing for the designated range.

Further, the present embodiment defines a parity write command to the flash package 113. The parity write command includes a range and data in the flash package address space 362 as a parameter. The parity write command instructs the flash package 113 to calculate the XOR of the data in the designated flash package address space 362 and the data in the designated address range, and then to write the calculation result back to the designated address range.

The flash package address spaces of the plurality of the flash packages 113 forming the stripe array 307 are different from each other in the usage rate by reclamation and data movement, and thus are also different in the free capacity. In the flash package address space, data is usually aligned from the top address.

Accordingly, when utilizing the free area in the flash package group 115, the storage controller 109 creates a stripe array in an aligned manner with an address which is used at last in the flash package address space the usage amount of which is the largest. The storage controller 109 identifies in the package group 115 the last values of the block numbers of the flash package address spaces used by the respective flash packages, and regards the largest value in these values as the capacity being used.

Figure 19:
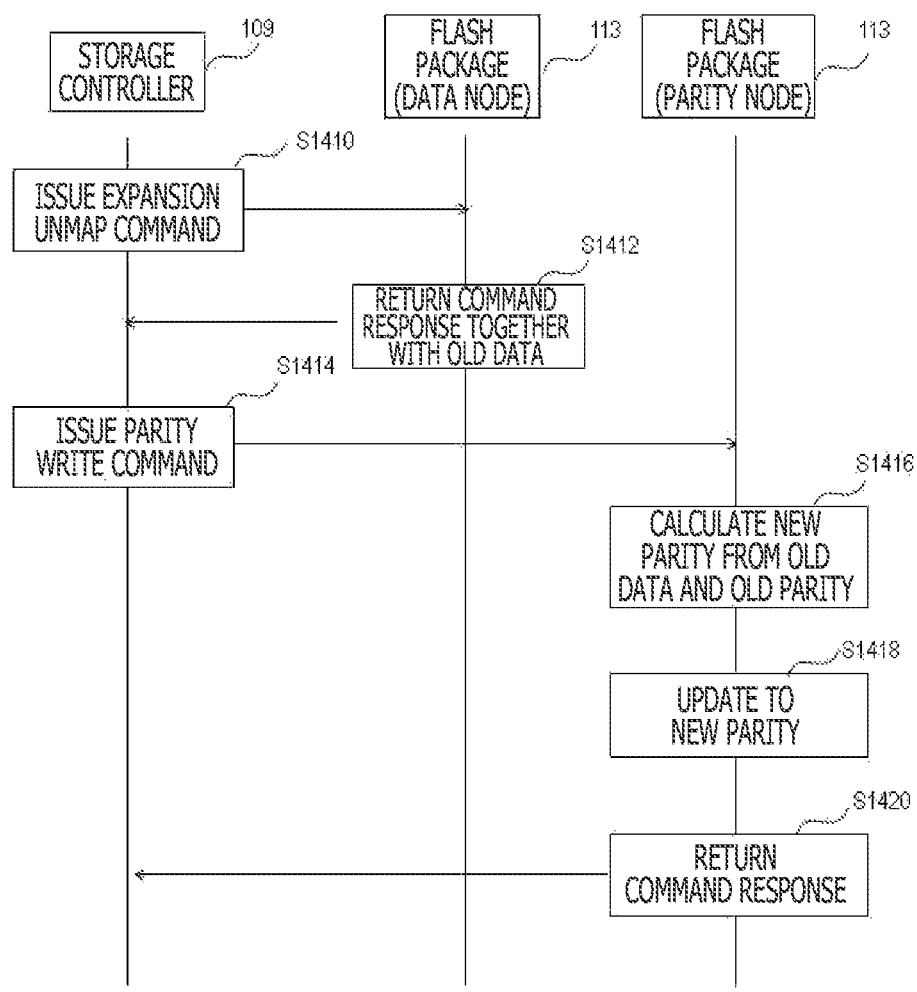
FIG. 19 depicts a ladder chart of a parity recalculation processing.

FIG. 19 depicts a ladder chart of the parity recalculation processing. The storage controller 109 issues the expansion UNMAP command to the flash package 113 (data node) while designating the range in the flash package address space 362 (S1410).

Upon receiving the expansion UNMAP command, the flash package 113 reads out the old data stored in the designated address range, and then executes the UNMAP command. The flash package 113 returns the old data together with the command response to the storage controller 109 (S1412).

The storage controller 109 issues a parity write command together with the obtained old data to the flash package 113 (parity node) storing the old parity (S1414). The parity write command designates the range in the flash package address space 362 in which the old parity is stored.

Upon receiving the parity write command, the flash package 113 performs the XOR calculation between the received old data and the stored parity (old parity) to calculate the new parity (S1416). The flash package 113 updated the old parity into the new parity (S1418).

Upon receiving the parity write command, the flash package 113 returns a response about the parity write command to the storage controller 109 (S1420). Owing to the expansion UNMAP command returning the old data, the number of times of command issuance for the parity calculation can be reduced, which can improve the performance. Further, a calculation by the storage controller 109 for the parity update is not necessary.

FIGS. 20A to 20C depict an example in which data in the flash packages 113 is changed by the extension UNMAP command and the parity write command. The flash package group 115 is configured by three flash packages 113. Two flash packages 113 are the data nodes, and one flash package 113 is the parity node. The letters denote data, and (XOR) denotes the XOR operation.

As depicted in FIG. 20A, there is a stripe array configured by data A, data B, and a parity of the data A and data B. As depicted in FIG. 20B, when the expansion UNMAP command is issued to the address of data A, the data in the address is managed to change from data A to 0.

There is a need for recalculating the parity in accordance with data update. The new parity is obtained by XOR operation with the old parity and the old data. As depicted in FIG. 20C, the parity node performs XOR calculation with A(XOR)B and A. The parity becomes B by the new parity calculation, so that the parity is updated to B.

Next, the data movement in the flash package 113 is described. There is a case where a free area of continuous addresses is required in the flash package 113. Such a free area can be created by the data movement in the flash package 113.

In the conventional data movement, the storage controller 109 issues to the flash package 113 a command for copying data with designating the copy source and the copy destination. The storage controller 109 reads out the data in the copy source and in the copy destination before issuing the copy command.

The flash package 113 copies the data from the copy source to the copy destination in accordance with the copy command. To make the data in the copy source "0," the storage controller 109 issues the UNMAP command with designating the copy source.

Since the data in the copy source and in the copy destination have been updated, there is a need for updating parities of stripe arrays in the respective copy source and copy destination. The storage controller 109 issues a read command to the flash package 113 storing the old parity in order to read out the old parity value necessary for the parity recalculation.

The flash package 113 returns the old parity value. The storage controller 109 calculates the new parity with using the old data and the old parity and issues a write command to store the new parity. The calculation of the parity is executed by XOR calculation with all data in the stripe array. This calculation is performed for both parities in copy source stripe array and copy destination stripe array.

In the present embodiment, data is moved by a method described below. In the present embodiment, a MOVE command is defined with respect to the flash package 113.

Figure 21:
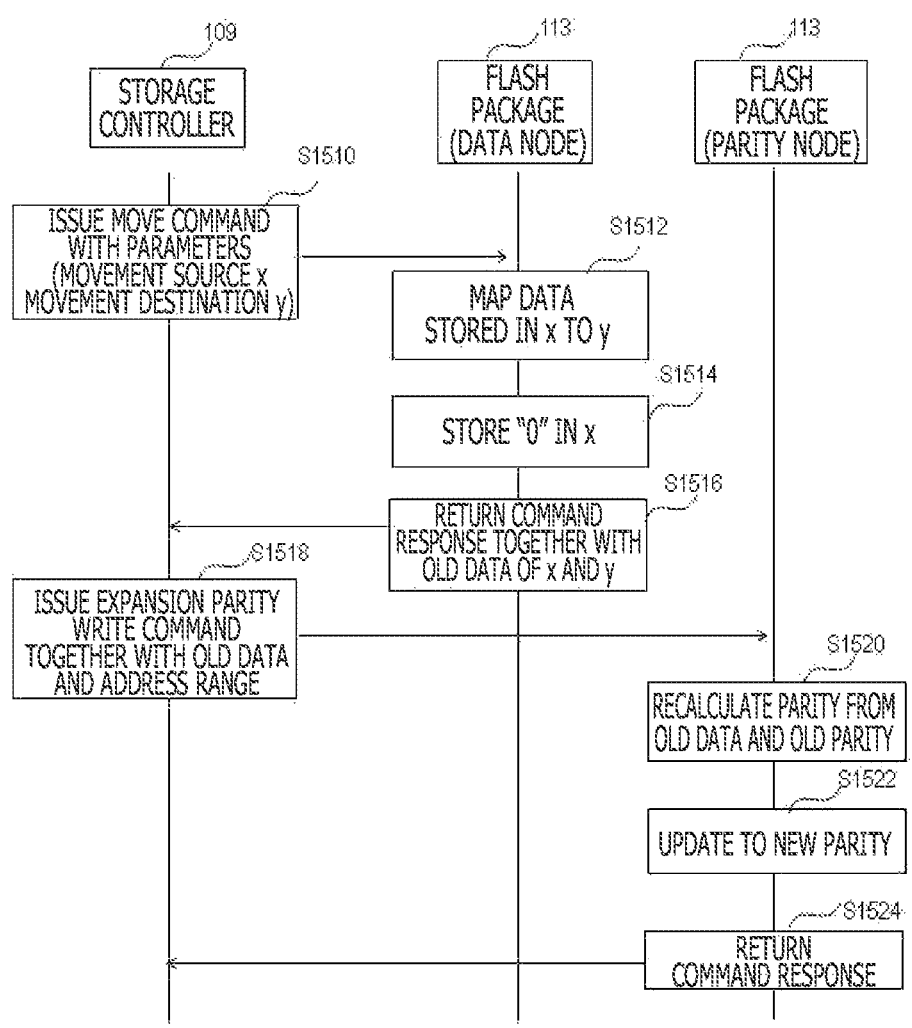
FIG. 21 depicts a ladder chart of a processing by a MOVE command.

FIG. 21 depicts a ladder chart of a processing by the MOVE command. The storage controller 109 issues the MOVE command to the flash package 113 (S1510). The MOVE command designates two address ranges x and y in the flash package address space 362.

The flash package 113 moves data stored in the address range x to the address range y (S1512). Then, the flash package 113 executes the UNMAP command for the address range x (S1514).

Actually, the flash package 113 performs the copy processing by updating the mapping table. The flash package 113 returns to the storage controller 109 a response to the MOVE command together with the pre-processing data stored in the address ranges x and y (S1516). Owing to the MOVE command, the number of times of command issuance for data movement can be reduced.

In the present embodiment, an expansion parity write command is defined with respect to the flash package 113. The expansion parity write command includes, as parameters, two address ranges p and q in the flash package address space 362 and data stored in the address ranges p and q. The flash package 113 calculates XORs for each address range with the designated data to update the data.

The storage controller 109 issues the expansion parity write command by designating old data in the movement destination and the parity storage location in the flash package 113 (parity node). Further, the storage controller 109 issues the expansion parity write command by designating old data in the movement source and the parity storage location in the flash package 113 (parity node) (S1518). While FIG. 21 depicts a case with only one parity node, however, the expansion parity write command is issued to respective parity nodes of the old data in the movement source and of the old data in the movement destination.

Upon receiving the expansion parity write command, the flash package 113 performs XOR calculation between the received old data and the stored parity (old parity) to calculate the new parity (S1520), and then updates the old parity to the new parity (S1522). The flash package 113, which has received the expansion parity write command, returns to the storage controller 109 a response with respect to the extension parity write command (S1524). Owing to the expansion parity write command, the number of times of the command issuance for parity recalculation can be reduced.

Figure 22A:
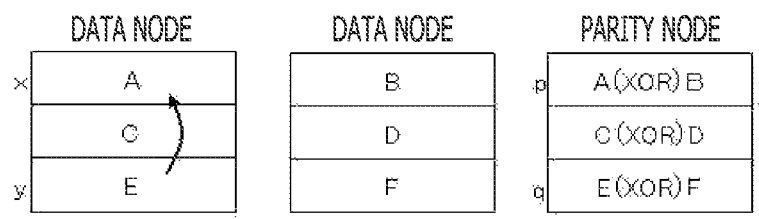
FIG. 22A depicts an example of changing data, in a flash package, executed by a MOVE command and parity write command.
Figure 22B:
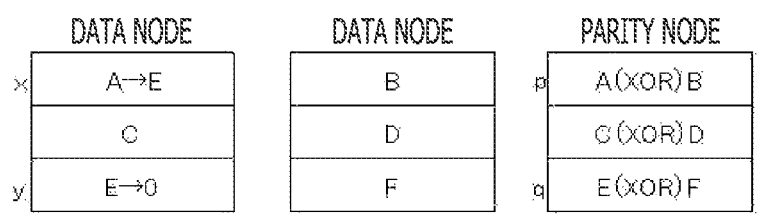
FIG. 22B depicts an example of changing data, in a flash package, executed by a MOVE command and parity write command.
Figure 22C:
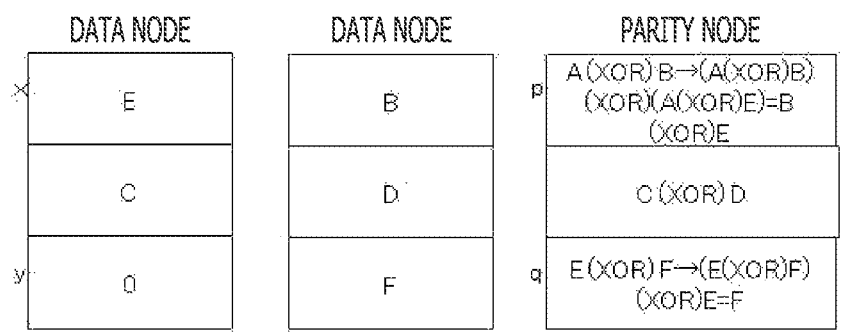
FIG. 22C depicts an example of changing data, in a flash package, executed by a MOVE command and parity write command.

FIGS. 22A to 22C depict an example in which data in the flash packages 113 is changed by the MOVE command and the parity write command. As depicted in FIG. 22A, the MOVE command designates an address range x and an address range y. Data A stored in the address range x and Data B stored in the address y are sent to the storage controller 109. After that, the data E stored in the address range y is moved to the address x.

As depicted in FIG. 22B, data stored in the address range y is changed to "0." As depicted in FIG. 22C, an expansion parity write command is issued for both the data A and the data E. In FIG. 22C, parity nodes of the data and the data E are the same. An XOR operation between the data A and the old parity generates a new parity, and the old parity is updated to the new parity. Further, an XOR operation between the data E and the old parity generates a new parity, and the old parity is updated to the new parity.

While the embodiment of the present invention has been described, the embodiment has only been presented by way of example and are not intended to limit the scope of the invention. A part of the subject matter of the embodiment may be omitted, replaced, and/or changed or modified in various forms without departing from the scope of the invention. Furthermore, part of the components of one embodiment can be replaced by part of the components of another, or part of the components of one embodiment can be added to the components of another. Further, each of the foregoing embodiments allows addition, removal, and replacement of certain components.

Note also that some or all of the structures, functions, processors, processing means and the like described above can be implemented with hardware designed by an integrated circuit. Data associated with the programs, tables, and files providing the functions can be stored, for example, on a storage device such as a non-volatile semiconductor memory, a hard disk drive, and an SSD, or on a computer-readable permanent data storage medium such as an IC card, an SD card, and a DVD.

The invention claimed is:

1. A storage apparatus comprising:
a storage device; and
a controller, wherein
a plurality of hierarchical address spaces mapped between a virtual volume and a storage medium are defined,
the plurality of hierarchical address spaces include
a real address space that is an address space of the storage medium of the storage device and that is managed by the storage device,
a first virtual address space that is an address space of the storage device and that can be recognized by the controller, and
a second virtual address space provided between the first virtual address space and the virtual volume,
the controller allocates an address area of the second virtual address space to the virtual volume in accordance with writing onto the virtual volume,
the controller allocates a different address area of the second virtual address space for overwriting onto a same address of the virtual volume,
the storage device allocates an address area of the real address space to the first virtual address space in accordance with writing onto the first virtual address space,
the controller manages an address area in the first virtual address space, in which an address area mapping to the real address space has been removed, as a usage prohibition area,
when a use state of the first virtual address space reaches a predetermined criterion, the controller or the storage device adds new continuous address areas to the first virtual address space to expand the first virtual address space,
the controller expands the second virtual address space in accordance with the expansion of the first virtual address space, and
the storage device allocates an area, in which a mapping to the first virtual address space has been removed, to the first virtual address space expanded,
the storage apparatus further including a cache that stores therein a write data for the virtual volume, and
wherein the controller is configured to:
allocate a different area of the cache for overwriting onto a same address in the virtual volume, and
expand an area of the cache in accordance with the expansion of the second virtual address space.

2. The storage apparatus according to claim 1, including
a plurality of storage devices including the storage device and configuring a RAID group, wherein
the second virtual address space is an address space of a pool configured by a plurality of volumes, and
the controller is configured to
add new address areas to respective first virtual address spaces of the plurality of storage devices to expand the first virtual address spaces of the plurality of storage devices,
define a volume in accordance with the expansion of the plurality of the first virtual address spaces, and
add the defined volume to the pool to expand the second virtual address space.

3. The storage apparatus according to claim 2, wherein
the controller sends a first command to a data node in the RAID group with designating a first address area in the first virtual address space, and
the data node returns a first data in the first address area to the controller in response to the first command, and further, removes a mapping between the first address area and the real address space.

4. The storage apparatus according to claim 3, wherein
the controller sends a second command, which designates a second address area for storing parity data of the first data, to a parity node of the first data together with the first data, and
the parity node generates, in response to the second command, a new parity by using an old parity stored in the second address area and the first data.

5. The storage apparatus according to claim 2, wherein
a first command is sent to a data node in the RAID group, with a first address area and a second address area in the first virtual address space being designated, and
the data node sends a first data in the first address area and a second data in the second address area to the controller in response to the first command, moves the first data to the second address area, and removes a mapping between the first address and the real address space.

6. The storage apparatus according to claim 5, wherein
the controller sends, together with the first data and the second data, a second command that designates a third address area storing parity data of the first data and a fourth address area storing a parity of the second data to parity nodes of the first data and the second data, and
in response to the second command, the parity nodes generate a new parity by using an old parity stored in the third address area, and generate a new parity by using an old parity and the second data stored in the fourth address area.

7. The storage apparatus according to claim 2, wherein
the controller expands the first virtual address space of the plurality of storage devices on the basis of a smallest free area in the plurality of storage devices.

8. A control method for a storage apparatus including a storage device and a controller, wherein
a plurality of hierarchical address spaces mapped between a virtual volume and a storage medium are defined, and
the plurality of hierarchical address spaces include
a real address space that is an address space of the storage medium of the storage device and that is managed by the storage device,
a first virtual address space that is an address space of the storage device and that can be recognized by the controller, and
a second virtual address space provided between the first virtual address space and the virtual volume,
the control method comprising:
allocating an address area of the second virtual address space to the virtual volume in accordance with writing onto the virtual volume;
allocating a different address area of the second virtual address space for overwriting onto a same address of the virtual volume;
allocating an address area of the real address space to the first virtual address space in accordance with writing onto the first virtual address space;
managing an address area in the first virtual address space, in which an address area mapping to the real address space has been removed, as a usage prohibition area;
adding new continuous address areas to the first virtual address space to expand the first virtual address space when a use state of the first virtual address space reaches a predetermined criterion;
expanding the second virtual address space in accordance with the expansion of the first virtual address space;

allocating an area, in which a mapping to the first virtual address space has been removed, to the first virtual address space expanded;

allocating a different area of the cache for overwriting onto a same address in the virtual volume; and expanding an area of the cache in accordance with the expansion of the second virtual address space.

9. The method according to claim 8, wherein the storage apparatus includes a plurality of storage devices having the storage device and configuring a RAID group, and the second virtual address space is an address space of a pool having a plurality of volumes, the method including:

adding new address areas to respective first virtual address spaces of the plurality of storage devices to expand the first virtual address spaces of the plurality of storage devices;

defining a volume in accordance with the expansion of the plurality of the first virtual address spaces; and adding the defined volume to the pool to expand the second virtual address space.

10. The method according to claim 9, including:

sending a first command from the controller to a data node in the RAID group with designating a first address area in the first virtual address space;

returning from the data node a first data in the first address area to the controller in response to the first command; and removing in the data node a mapping between the first address area and the real address space.

11. The method according to claim 10, including:

sending together with the first data and the second data a second command, which designates a second address area for storing parity data of the first data, from the controller to data node of the first data, and generating in the parity node, in response to the second command, a new parity in the parity node using an old parity stored in the second address area and the first data.

12. The method according to claim 9, wherein sending a first command from the controller to a data node in the RAID group with designating a first address area and a second address area in the first virtual address space, and sending, in response to the first command, first data in the first address area and second data in the second address area from the data node to the controller, and removing in the data node the mapping between the first address area and the real address space by moving the first data to the second address area.

13. The method according to claim 12, including:

sending a second command from the controller to parity nodes of the first data and the second data together with the first data and the second data, the second command designating a third address area storing parity data of the first data and a fourth address area storing parity of the second data, and generating in the parity nodes, in response to the second command, a new parity by using an old parity stored in the third address area and the first data, and generating a new parity by using an old parity stored in the fourth address area and the second data.

\* \* \* \* \*